United States Patent
Miyasaka

(10) Patent No.: US 11,556,106 B2
(45) Date of Patent: Jan. 17, 2023

(54) PROGRAMMABLE LOGIC CONTROLLER

(71) Applicant: Keyence Corporation, Osaka (JP)

(72) Inventor: Tetsuya Miyasaka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 1 day.

(21) Appl. No.: 17/232,186

(22) Filed: Apr. 16, 2021

(65) Prior Publication Data

US 2021/0364996 A1 Nov. 25, 2021

(30) Foreign Application Priority Data

May 25, 2020 (JP) .............................. JP2020-090773

(51) Int. Cl.
*H04N 5/232* (2006.01)
*G05B 19/05* (2006.01)
*G05B 19/418* (2006.01)

(52) U.S. Cl.
CPC ....... *G05B 19/058* (2013.01); *G05B 19/4183* (2013.01); *H04N 5/23203* (2013.01)

(58) Field of Classification Search
None
See application file for complete search history.

(56) References Cited

U.S. PATENT DOCUMENTS

| | | | | |
|---|---|---|---|---|
| 2006/0102858 | A1* | 5/2006 | Fujii | G01N 21/88 250/559.45 |
| 2019/0018385 | A1 | 1/2019 | Soneda et al. | |
| 2020/0105080 | A1* | 4/2020 | Maeno | G06V 20/52 |
| 2020/0125060 | A1 | 4/2020 | Fujimura | |
| 2020/0125061 | A1 | 4/2020 | Miyasaka | |
| 2020/0259998 | A1 | 8/2020 | Tsujikawa | |
| 2021/0103264 | A1 | 4/2021 | Nakamura | |
| 2021/0103265 | A1 | 4/2021 | Fujimura | |

FOREIGN PATENT DOCUMENTS

JP 201897663 A 6/2018

OTHER PUBLICATIONS

U.S. Appl. No. 17/126,209, filed Dec. 18, 2020 (109 pages).

* cited by examiner

*Primary Examiner* — Eileen M Adams
(74) *Attorney, Agent, or Firm* — Kilyk & Bowersox, P.L.L.C.

(57) ABSTRACT

An object of the present subject matter is to appropriately acquire and analyze a camera image for monitoring and to constantly monitor a monitoring target with high accuracy. A programmable logic controller (PLC) includes: an image processing section for sequentially acquiring the image data of the camera image from the camera sensor and generating characteristic amount data indicating a characteristic amount of image data in a preset monitoring region; a time-series data acquisition section for sequentially collecting characteristic amount data from the image processing section and acquiring time-series data of a characteristic amount; and a monitoring section for monitoring time-series data of a current characteristic amount acquired by the time-series data acquisition section in accordance with a monitoring timing defined by the device of the device memory.

17 Claims, 24 Drawing Sheets

| COLLECTION COUNT | TIMER | Dev1 | Dev2 | Dev10 |
|---|---|---|---|---|
| 511 | 43252 | 0x0016 | 0x0010 | 0x0012 |
| 512 | 43350 | 0x0013 | 0x0010 | 0x001F |
| 513 | 43460 | 0x0015 | 0x0010 | 0x0025 |
| 514 | 43555 | 0x0011 | 0x0010 | 0x002E |
| 515 | 43653 | 0x0018 | 0x0010 | 0x0034 |

PROGRAMMABLE LOGIC CONTROLLER

CROSS-REFERENCE TO RELATED APPLICATIONS

The present application claims foreign priority based on Japanese Patent Application No. 2020-090773, filed May 25, 2020, the contents of which are incorporated herein by reference.

BACKGROUND OF THE INVENTION

1. Field of the Invention

The present invention relates to a programmable logic controller.

2. Description of Related Art

A programmable logic controller (PLC) is a controller (control apparatus) that controls industrial machines, such as manufacturing equipment, a transport apparatus, and an inspection apparatus, in factory automation (JP 2018-097663 A).

Further, an image sensor is used to detect abnormalities in equipment, control apparatuses, and manufactured products in a factory.

However, there are static and dynamic types of abnormalities in facilities to be controlled, and the image sensor only determines whether or not the pattern matching has succeeded and is not suitable for determining static and dynamic abnormalities. The image sensor is excellent in clearly distinguishing between normal and abnormal but has difficulties in detecting a condition which is "different from usual".

SUMMARY OF THE INVENTION

In view of at least one of the above problems, it is an object of the present invention to appropriately acquire and analyze a camera image for monitoring and to constantly monitor a monitoring target with high accuracy.

The present subject matter is, for example, a programmable logic controller, including an execution engine that repeatedly executes a user program; a device memory that stores a device value of a device to be accessed by the execution engine in accordance with the user program; a camera input interface for connecting a camera sensor that sequentially takes an image in accordance with photographing conditions and sequentially generates image data of the taken camera image; an image processing section for sequentially acquiring the image data of the camera image from the camera sensor via the camera input interface and generating characteristic amount data indicating a characteristic amount of image data in a preset monitoring region among the acquired image data of the camera image; a time-series data acquisition section for sequentially collecting characteristic amount data from the image processing section and acquiring time-series data of a characteristic amount; and a monitoring section for monitoring time-series data of a current characteristic amount acquired by the time-series data acquisition section in accordance with a monitoring timing defined by the device of the device memory.

According to the present subject matter, a camera image for monitoring is appropriately acquired and analyzed, and a monitoring target can be constantly monitored with high accuracy.

DETAILED DESCRIPTION OF PREFERRED EMBODIMENTS

Figure 1:
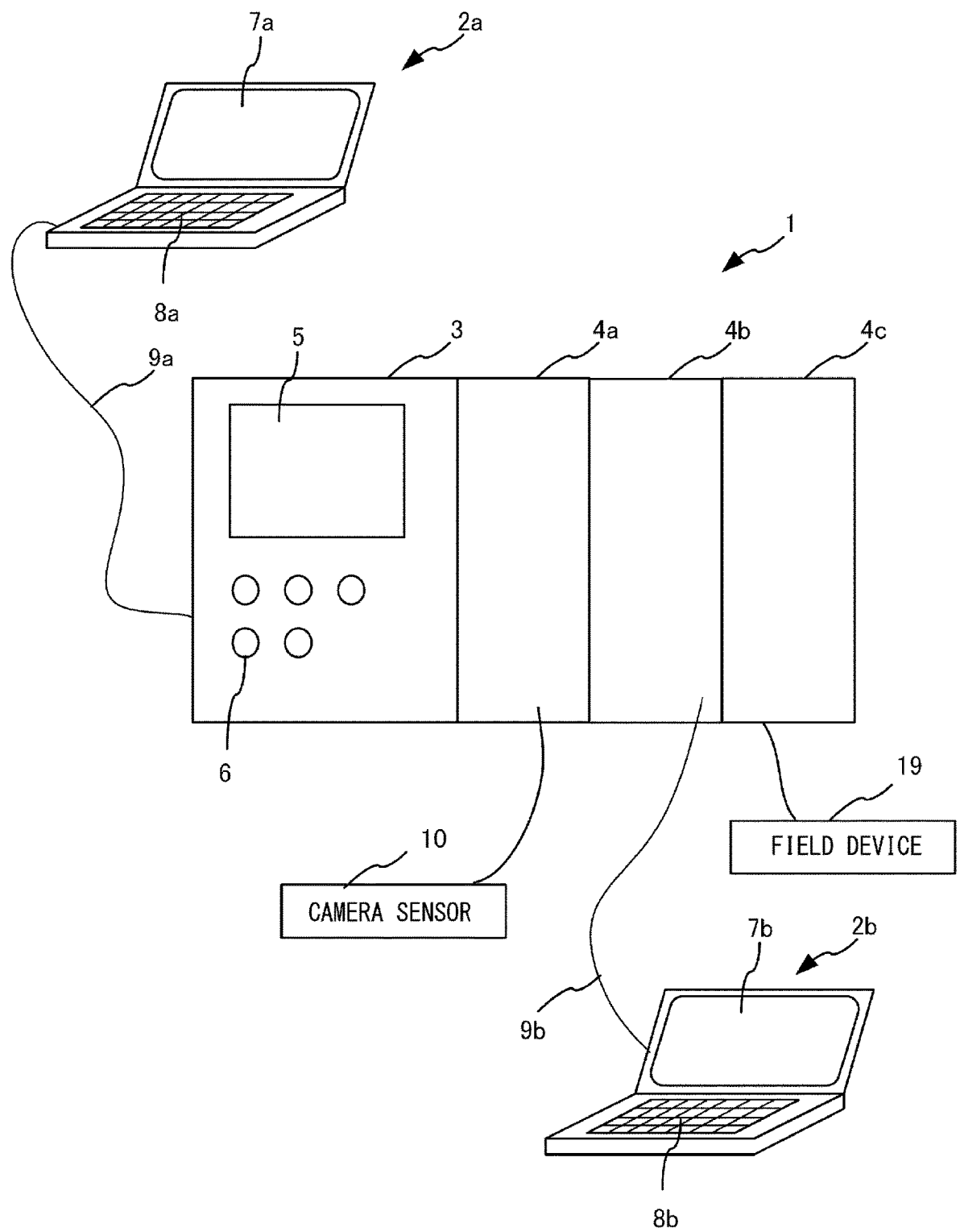
FIG. 1 is a diagram showing a PLC system.

Hereinafter, embodiments will be described in detail with reference to the accompanying drawings. Note that the following embodiments are not intended to limit the subject matter according to the claims, and not all combinations of characteristics described in the embodiments are essential to the subject matter. Two or more characteristics out of a plurality of characteristics described in the embodiments may be combined optionally. In addition, the same or similar components are given the same reference numerals, and the duplicated description is omitted. A lowercase alphabetic character may be added to the end of the reference signs indicating the same or similar elements. When matters common to a plurality of elements are described, the lowercase alphabets are omitted.

First Embodiment

<System Configuration>

In the following, a first embodiment of the present subject matter will be described. First, in order to enable a person skilled in the art to better understand a programmable logic controller (PLC, which may simply be referred to as a programmable controller), the configuration of a general PLC and the operation thereof will be described.

FIG. 1 is a conceptual diagram showing a configuration example of a programmable logic controller system according to an embodiment of the present subject matter. As shown in FIG. 1, the system includes a PC 2 configured to edit a user program such as a ladder program, and a programmable logic controller (PLC) 1 configured to integrally control various control apparatuses installed in a factory or the like. PC is an abbreviation of personal computer. The user program may be created using a graphical programming language such as a motion program of a flowchart type, such as a ladder language or a sequential function chart (SFC), or may be created using a high-level programming language such as a C language. In the following, the user program is a ladder program for the convenience of description. The PLC 1 includes a basic unit 3 incorporating a CPU and one or a plurality of extension units 4. One or the plurality of extension units 4 can be attached to and detached from the basic unit 3.

The basic unit (also referred to as CPU unit) 3 includes a display part 5 and an operation part 6. The display part 5 can display an operation state or the like of each extension unit 4 attached to the basic unit 3. The display part 5 switches the display content according to the operation content of the operation part 6. The display part 5 normally displays a current value (device value) of a device in the PLC 1 and error information generated in the PLC 1. Here, the device includes various devices, such as a relay, a timer, and counter, included in the basic unit 3 and the extension unit 4, refers to a region on a memory provided for storing a device value, and may be referred to as a device memory. The basic unit 3 collects and stores a device value of each device. Note that the device memory is a non-volatile memory and may be made of a rewritable non-volatile ROM, and non-volatility may be achieved by battery backup or the like of a non-volatile RAM or the like. ROM is an abbreviation of read-only memory. RAM is an abbreviation of random-access memory. The device value is information indicating an input state from input equipment, an output state to output equipment, and states of an internal relay (auxiliary relay) set on the user program, a timer, a counter, a data memory, and the like. The types of device values are a bit type, a word type, and the like. The bit device stores a 1-bit device value, for example, 0/1, ON/OFF, H/L, and the like. The word device stores a device value of an arbitrary size. As a collection target of a control program or the like to be described later, a variable may be designated as a device. The variable is also a holding section for holding information and is accessed by the execution engine in accordance with the user program. Thus, in the following description, a device also refers to a variable. Note that a memory holding a device may be referred to as a device memory. A memory holding collected data may be referred to as a data memory.

The extension unit 4 is prepared for extending the function of the PLC 1. To each extension unit 4, a field device corresponding to the function of the extension unit 4 may be connected, whereby each field device is connected to the basic unit 3 via the extension unit 4. The field device may be input equipment such as a sensor or a camera or may be output equipment such as an actuator. A plurality of field devices may be connected to one extension unit 4. In the example of FIG. 1, an example is shown in which a camera sensor 10, which is a field device, is connected to a camera input unit 4a, which is an extension unit. Further, an example is shown in which other field devices 19, such as a sensor and a switch, are connected to the extension unit 4c.

The camera input unit 4a, which is the extension unit, sequentially acquires a camera image sequentially taken by the connected camera sensor 10 in accordance with photographing conditions, extracts a characteristic amount relating to the amount of light received or luminance from the acquired camera images, and sequentially generates characteristic amount data. The generated characteristic amount data is collected by an analysis unit 4b during constant monitoring. In the system, apart from the constant monitoring, the operation record analysis is performed in which the device value and the image data of the camera image are held as the operation record of the system, and analysis is performed using the held device value and camera image at a predetermined analysis timing. In this case, the characteristic amount data may be generated from the image data held in the camera input unit 4a at the time of analysis, or may be similarly acquired at the timing of acquiring the device value of each device from the basic unit 3 and held in the storage apparatus 32 of the basic unit 3, collected as data to be monitored, and transferred to the analysis unit 4b when monitoring conditions are satisfied. That is, in the system according to the present embodiment, even during the constant monitoring, information relating to the operation record is held by the basic unit 3 and the extension unit 4 and is used by the analysis unit 4b as data to be analyzed at a predetermined analysis timing. According to the present subject matter, during constant monitoring, for example, the camera image from the camera sensor 10 is monitored in accordance with the monitoring timing defined by the device of the device memory. The characteristic amount data to be monitored during the constant monitoring may be acquired at a scan time level synchronized with a scan cycle, which is an acquisition cycle of a device value to be described later, or may be acquired asynchronously. When the characteristic amount data is acquired in synchronization with the scan cycle, the image of the camera image can be easily evaluated in relation to the device value of another device, so that an abnormality can be detected more accurately and efficiently. The camera sensor 10 acquires moving image data and generates image data such as BMP and JPEG. Characteristic amount data relating to each of the amount of light received and luminance is generated from the image data, and the characteristic amount data is sequentially collected in a memory and saved as time-series data. The type of the camera sensor is not particularly limited but may be a camera dedicated to the camera input unit or may be a Web camera or a Gigabit Ethernet (GigE) camera, but in the case of being combined with control data, the camera sensor is preferably a camera dedicated to the camera input unit 4a.

In the present embodiment, the analysis unit 4b, which is an extension unit, is a unit for analyzing the characteristic amount data from the camera input unit 4a and the device value of each device and shows a form in which the field device is not connected.

The analysis unit 4b is an extension unit which, during the constant monitoring, acquires the device value and the characteristic amount data generated by the camera input unit 4a and analyzes whether or not the state is a "state different from usual" on the basis of cyclic changes in the acquired data. The analysis unit 4b can also acquire time-series data of the device acquired by the basic unit 3 and collected as an operation record by a first buffer 37a of the basic unit 3 at an analysis timing such as a case where the saving condition of the device is satisfied, and analyze the cause of the "state different from usual". Further, the analysis unit 4b creates display target data such as a monitoring screen by executing a program such as a flow to be described later to execute data processing on the collected data, and creates display data for displaying a dashboard on a display part 7b of a PC 2b or a display (not shown) provided in the analysis unit 4b. In the present embodiment, an example in which the analysis unit 4b operates as an analysis apparatus will be described, but this is not intended to limit the present subject matter, and the basic unit 3 may function as an analysis apparatus. Although not shown, another PC may be connected to the extension unit via a network to display a monitoring screen generated on the PC, or the like. A flow program of a flow to be described below is only an example of a control program. The basic unit 3 is sometimes referred to as a CPU unit. Note that the system including the PLC 1 and the PC 2 may be referred to as a programmable logic controller system.

The PC 2a transfers project data to the PLC 1. On the other hand, the PC 2b is a computer mainly operated by a person in charge in the field. The project data includes setting information such as thresholds and monitoring regions in the control programs of the basic unit 3, the camera input unit 4a, and the analysis unit 4b and in various functions. The control program is a program described by a ladder language, a flow, or the like executed by the control engine. The setting information of various functions includes, for example, a flag indicating an attribute of data and a write destination of data. The basic unit can be set for each unit by determining an appropriate write destination of each information in accordance with the flag and writing. The setting information may also include setting information of the camera itself, for example, exposure time, contrast, and the like. The PC 2a may be, for example, a portable notebook type or tablet-type personal computer or smart phone and is an external computer including the display part 7 and an operation part 8. The external computer means a computer located outside the PLC 1. A ladder program, which is an example of a user program for controlling the PLC 1, is created using the PC 2a. The created ladder program is converted into a mnemonic code in the PC 2a. The PC 2a is connected to the basic unit 3 of the PLC 1 via a communication cable 9a such as a universal serial bus (USB) cable. For example, the PC 2a sends the ladder program converted into a mnemonic code to the basic unit 3. The basic unit 3 converts the ladder program into a machine code and stores the machine code into a memory provided in the basic unit 3. Here, the mnemonic code is transmitted to the basic unit 3, but the present subject matter is not limited thereto. For example, the PC 2a may convert the mnemonic code into an intermediate code and transmit the intermediate code to the basic unit 3.

Although not shown in FIG. 1, the operation part 8 of the PC 2 may include a pointing device such as a mouse connected to the PC 2. The PC 2 may be configured to be detachably connected to the basic unit 3 of the PLC 1 via another communication cable 9 except for the USB cable. Further, the PC 2 may be connected to the basic unit 3 of the PLC 1 by wireless communication without the communication cable 9.

<Program Creation Support Apparatus>

Figure 2:
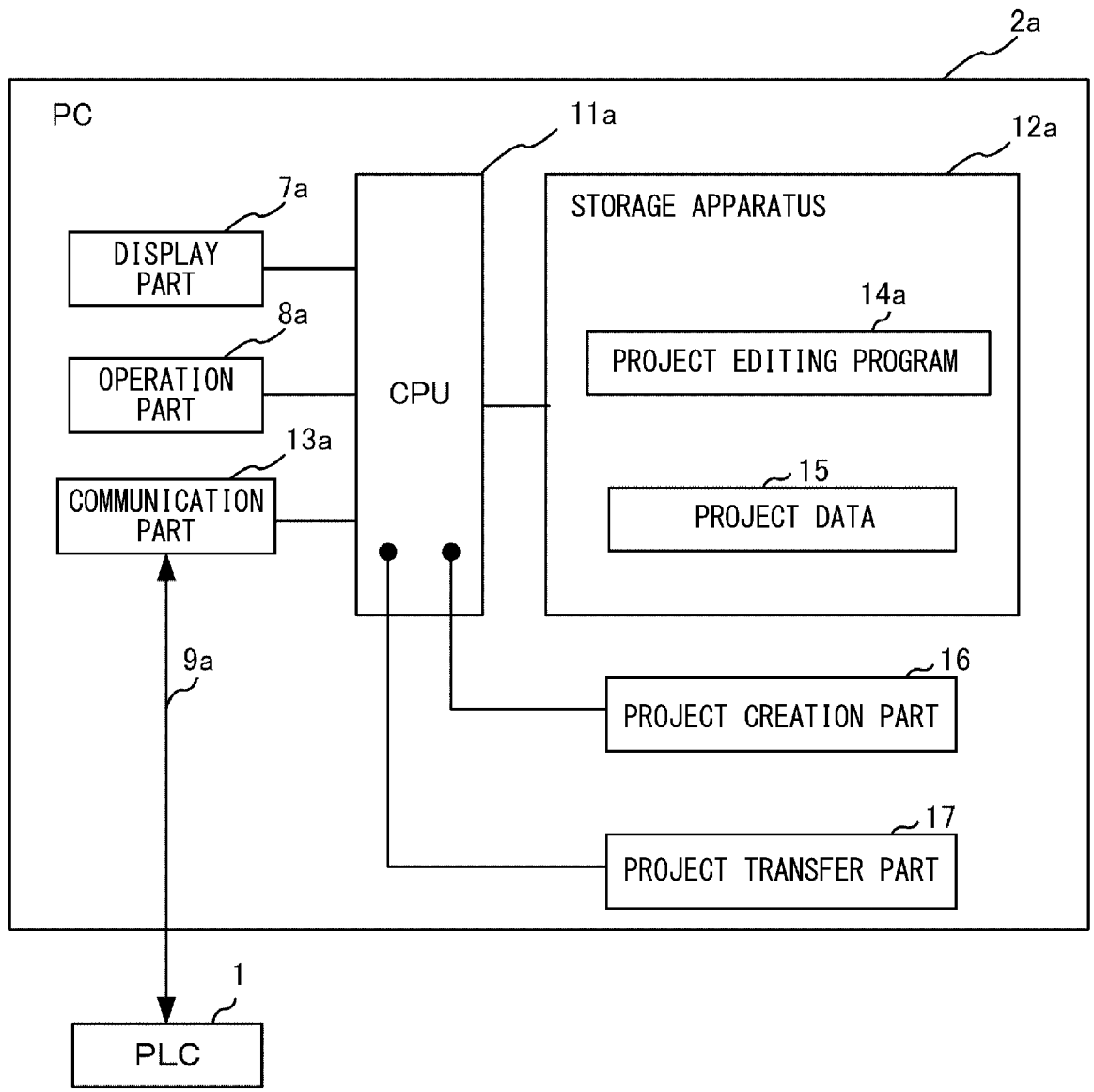
FIG. 2 is a diagram for explaining a personal computer (PC)

FIG. 2 is a block diagram for explaining the electrical configuration of the PC 2. As shown in FIG. 2, the PC 2a includes a CPU 11a, a display part 7a, an operation part 8a, a storage apparatus 12a, and a communication part 13a. The display part 7a, the operation part 8a, the storage apparatus 12a, and the communication part 13a are each connected electrically to the CPU 11a. The storage apparatus 12a includes a RAM, a ROM, an HDD, and an SSD and may further include a removable memory card. CPU is an abbreviation of central processing unit. HDD is an abbreviation of hard disk drive. SSD is an abbreviation of solid-state drive.

The user of the PC 2a causes the CPU 11a to execute a project editing program 14a stored in the storage apparatus 12a and edits project data 15 through the operation part 8a. When the CPU 11a executes the project editing program 14a, a project creation part 16 and a project transfer part 17 are achieved. The project creation part 16 creates the project data 15 in accordance with input by a user. The project transfer part 17 transfers the project data 15 to the PLC 1. The project data 15 includes one or more user programs such as a ladder program, a control program, a motion program, and a data utilization program, configuration information of each of the basic unit 3 and the extension unit 4, and setting information of an identification function provided in each of the basic unit 3 and the extension unit 4. The configuration information includes connection positions of the plurality of extension units 4 to the basic unit 3 and allocation information of devices. The configuration information may include information indicating functions provided in the basic unit 3, such as a data collection function, a communication function, and a positioning function, and may include information indicating functions of the extension unit 4, such as a communication function, a positioning function, and a photographing function. The setting information of the identification function includes setting information relating to the functions provided in the basic unit 3, such as the data collection function, the communication function, and the positioning function, and for example, in the case of the data collection function, the setting information includes setting information for data collection conditions and data to be collected, and the setting information includes setting information relating to the functions of the extension unit 4, such as the communication function, the positioning function, the data utilization function, and the photographing function. The editing of the project data 15 includes the creation and change of the project data 15. The user can read the project data 15 stored in the storage apparatus 12a as necessary and change the project data 15 by using the project editing program 14a. The communication part 13a communicates with the basic unit 3 via a communication cable 9a. The project transfer part 17 transfers the project data to the basic unit 3 via the communication part 13a.

<PC Used to Display Dashboard>

Figure 3:
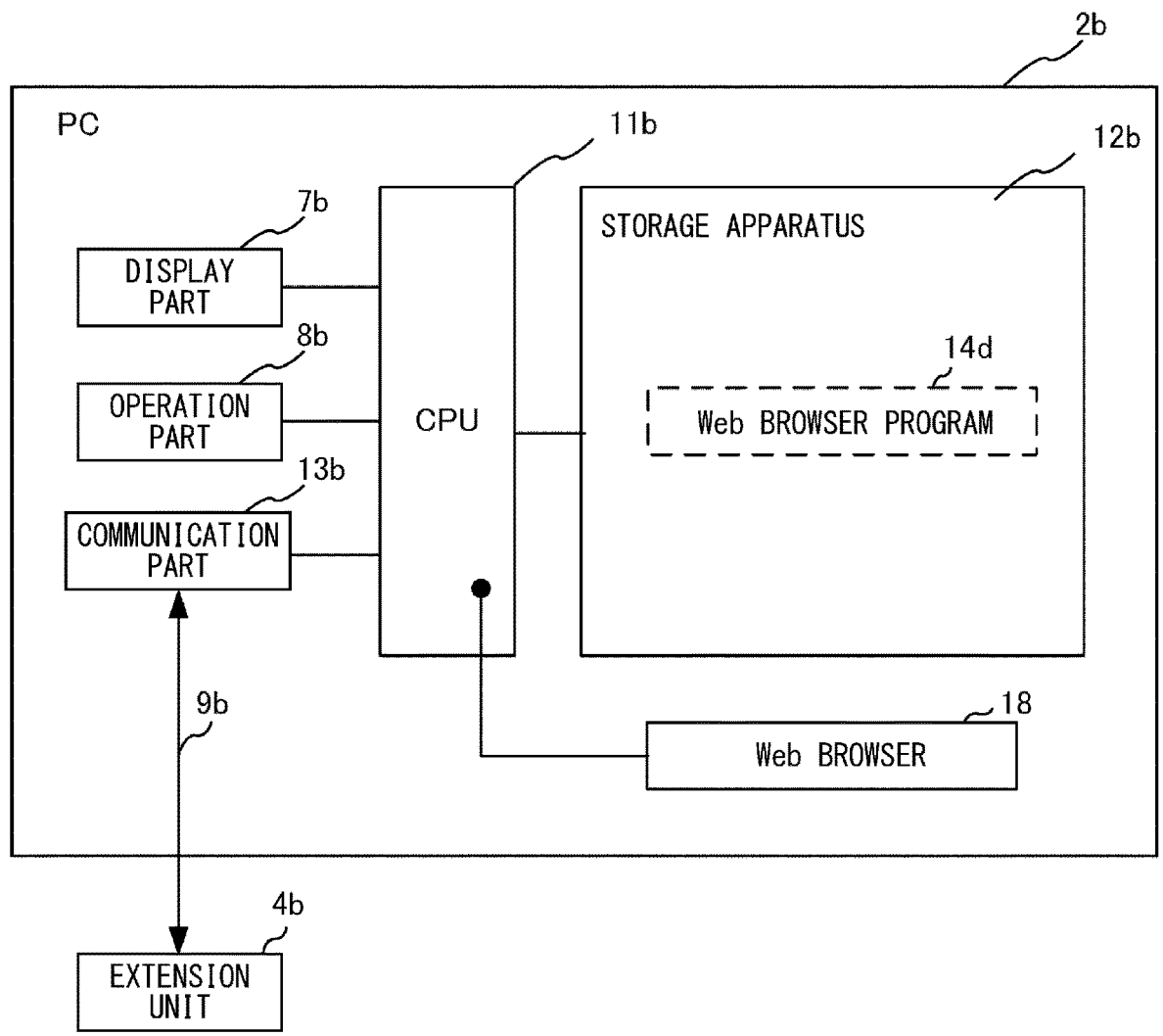
FIG. 3 is a diagram for explaining the PC.

FIG. 3 is a block diagram for explaining the electrical configuration of the PC 2b. As shown in FIG. 3, the PC 2b includes a CPU 11b, a display part 7b, an operation part 8b, a storage apparatus 12b, and a communication part 13b. The display part 7b, the operation part 8b, the storage apparatus 12b, and the communication part 13b are each connected electrically to the CPU 11b. The storage apparatus 12b includes a RAM, a ROM, an HDD, an SSD and may further include a removable memory card.

The CPU 11b executes a web browser program 14d to achieve a web browser 18. The web browser 18 accesses, via the communication part 13b, a setting page of a data utilization application provided by the analysis unit 4b or a page of a dashboard. Further, the CPU 1ib displays an identification result (determination result) at the time of occurrence of an abnormality on the display part 7b in accordance with screen information indicating the identification result transmitted from the analysis unit 4b.

<PLC>

Figure 4:
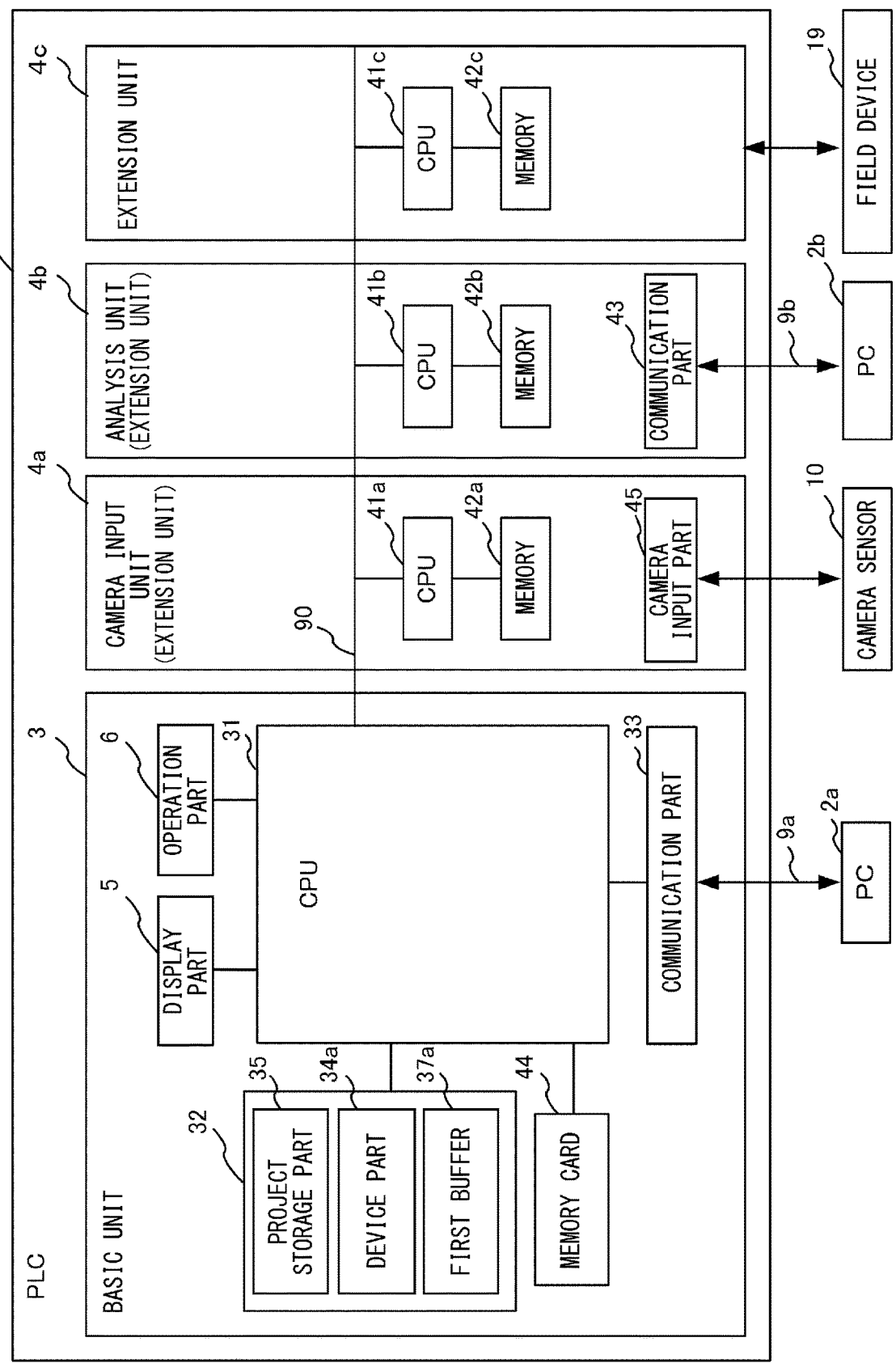
FIG. 4 is a diagram for explaining a PLC.

FIG. 4 is a block diagram for explaining the electrical configuration of the PLC 1. As shown in FIG. 4, the basic unit 3 includes a CPU 31, the display part 5, the operation part 6, a storage apparatus 32, a communication part 33, and a memory card 44. The display part 5, the operation part 6, the storage apparatus 32, and the communication part 33 are each connected electrically to the CPU 31. The storage apparatus 32 may include a RAM or a ROM. The storage apparatus 32 has a plurality of storage areas such as a device part 34, a project storage part 35, and a first buffer 37a. A device part 34a has a bit device, a word device, and the like, and each device stores the current device value in accordance with a predetermined acquisition setting, which corresponds to a device memory. The project storage part 35 stores the project data inputted from the PC 2a. The first buffer 37a normally collects a device value to be collected from the device part 34a in accordance with a predetermined collection setting for each scanning cycle as history data of operation records of the system. Further, the first buffer 37a may store, as a device value, characteristic amount data of a camera image taken by the camera sensor 10, the data having been generated in the camera input unit 4a.

Here, the constant monitoring means, for example, a case where the camera image is monitored in accordance with the monitoring timing defined by the device value of the device memory, and shows a monitoring form that monitors one or more predetermined device values collected on a cyclic basis and the camera image. That is, in the present embodiment, the term "constant monitoring" does not mean that monitoring is always performed continuously but should be understood as monitoring in which, at a timing adjusted to a certain predetermined cycle, the device value and the camera image at that timing are monitored. On the other hand, the "operation record analysis" is a monitoring form in which that device value, camera image, or the characteristic amount data thereof are held as history data in accordance with the predetermined collection timing and predetermined collection settings as described above, and later, at a predetermined analysis timing, for example, when a state different from usual is detected in the constant monitoring or when a saving condition to be described later is satisfied, analysis of the cause is performed using the history data Therefore, the constant monitoring and the operation record analysis are not performed exclusively but can be performed in parallel.

Note that as described above, the data from the camera input unit 4a collected by the analysis unit 4b and, optionally, by the basic unit 3, is the characteristic amount data of the camera image taken by the camera sensor 10 and is not the image data image data itself. Thus, a communication load between each unit can be reduced, and a processing load in each unit can be reduced. Naturally, depending on the processing performance and communication performance of the system, the image data of the camera image itself may be collected, and the present subject matter is not limited.

Details of the first buffer 37a will be described later with reference to FIG. 5. When the saving condition is satisfied, the memory card 44 stores time-series data from each device stored in the first buffer 37a. By temporarily holding the time-series data in the memory card 44, for example, the data to be verified can be verified later in an external apparatus or the like, and the important latest data can be held as log information. The data saved into the memory card 44 is history data used for analyzing the factor of a "state different from usual" in the operation record analysis when the "state different from usual" is detected in the constant monitoring. Therefore, it is preferable that the device values of all the devices are saved into the memory card 44 when a change equal to or larger than a predetermined value or a change different from usual is detected. Here, the camera sensor 10 may be included in all the devices, and in this case, the characteristic amount data may be saved as a device value into the memory card 44. As a result, it is possible to use the characteristic amount, in which a change different from usual has been detected in the constant monitoring, for the operation record analysis. Note that as will be described later, when the monitoring condition such as the monitoring region is reset, the characteristic amount is not always the same, but even in that case, it is possible to use the characteristic amount data obtained from the image data held in a moving image memory 37e, which will be described later, of the camera input unit 4a.

Here, all devices include at least devices used in the control program and can be selected and set by the user in units of programs or units. In this case, the data to be saved is preferably data for a predetermined period before and after the detection of the state different from usual. Hence a control configuration is necessary in which, for example, the first buffer 37a, which is a ring buffer, is used to always hold the data of all the devices for a predetermined period, and when an abnormality occurs, the data of the ring buffer is saved into the memory card 44. Here, the saving condition is satisfied when an abnormality, a state different from usual, is detected in the analysis using the captured image of the camera sensor 10. In addition, the saving condition is satisfied when an analysis command is given by the user. The saving conditions may be preset by the user and saved in the storage apparatus 32 of the basic unit 3 as a part of the project data. When the CPU 31 detects that the saving condition has been satisfied, the CPU 31 issues a command to save the device value stored in the first buffer 37a, which is the ring buffer, into the memory card 44, such as a secure digital (SD) card, and notifies the analysis unit 4b that the data to be analyzed has been saved. For example, the execution engine changes one value of the device memory, and the analysis unit 4b monitors whether or not there is a change in a predetermined value of the device memory, thereby recognizing that data saving has been performed, and the analysis unit 4b acquires data from the memory card 44 of the basic unit 3 and performs analysis, thereby identifying an abnormal device and identifying abnormal contents. This monitoring form is an example of the monitoring form of the operation record analysis described above.

A control program for the basic unit 3 is stored into the project storage part 35 as a part of project data. The control program for the basic unit 3 may be stored, into the storage apparatus 32 separately from the project storage part 35 or in addition to the project storage part 35. As shown in FIG. 4, the basic unit 3 and the extension unit 4 are connected to each other via an extension bus 90, which is a type of communication bus and an internal bus. In FIG. 4, a communication circuit relating to the extension bus 90 is mounted on the CPU 31 but may be mounted as a part of the communication part 33. The communication part 33 may have a network communication circuit. The CPU 31 receives the project data from the PC 2a via the communication part 33.

Here, a supplemental description will be given of the extension bus 90. The extension bus 90 is a communication bus used for input/output refresh. The input/output refresh is processing in which an input value is fetched before each execution of the ladder program at the time of executing the ladder program, and the ladder program is repeatedly executed on the basis of the fetched input value, and the input/output refresh is processing for holding a previous value even when the input value changes during one execution. The value fetched by the input/output refresh is stored into the device memory as the device value of the device corresponding to each input. By the input/output refresh, the device value is transmitted/received between the basic unit 3 and the extension unit 4, and the device value of the corresponding device in the device memory is updated. The input/output refresh is executed in every scan cycle, that is, in each on scan, in which the ladder program is executed once. One scan cycle includes an input/output refresh execution period, a ladder program execution period, and an end processing execution period. Further, as described above, the characteristic amount data from the camera input unit 4a may be acquired in the basic unit 3 in synchronization with the scan cycle. Note that this is not intended to limit the present subject matter, and the characteristic amount data may be acquired asynchronously with the scan cycle. For example, in the camera input unit 4a, when an abnormal value (value different from usual) is acquired in the analysis of the captured image by the camera sensor 10, the basic unit 3 and the analysis unit 4b may be notified, and the basic unit 3 and the analysis unit 4b may acquire the characteristic amount data in a predetermined section before and after the occurrence of the abnormality.

The extension unit 4 includes a CPU 41 and a memory 42. The camera input unit 4a further includes a camera input unit 45 that acquires a camera image taken by the camera sensor 10. The analysis unit 4b further includes a communication part 43 that transmits and receives data to and from the PC 2b, and the analysis unit 4b may include a memory card such as a secure digital (SD) card that stores time-series data of control data from each device, which is detachable from the analysis unit 4b. The memory 42 includes a RAM and a ROM. In particular, in the RAM, a storage area to be used as a buffer memory is ensured. The memory 42 may have a buffer that temporarily holds data, such as a device value, still image data, and video data, acquired by the field device.

The CPU 41b of the analysis unit 4b communicates with the PC 2b via the communication part 43 and the cable 9b. The CPU 41b includes a function of acquiring and analyzing control data such as a device value and characteristic amount data saved in the memory card 44 provided in the basic unit 3 or in the memory card provided in the analysis unit 4b, a dashboard for displaying the results of the analysis processing, and a function of transmitting the results of the processing to the outside. These processing functions are stored into the memory 42b as a flow program, and are read and executed in the CPU 41b.

Note that the function of collecting control data may be achieved by a user program. The function for performing the processing related to the collected data includes an identification function for identifying an abnormal device at the time of abnormality of the programmable logic controller, an analysis function for analyzing a deviation from the time-series data at the normal time and verifying a device value different from usual, and a monitoring function for periodically performing the above analysis. The flow program may have an arithmetic block for collecting data, an arithmetic block for executing data processing, an arithmetic block for creating display data, and the like. The dashboard has graph display parts, numerical display parts, and the like. These display parts may be achieved by HyperText Markup Language (HTML) data, Cascading Style Sheets (CSS) data, a JavaScript (registered trademark) code, or the like. Note that the aggregate of the HTML data, the CSS data, and the JavaScript (registered trademark) code may be referred to as a web application. In the present embodiment, the flow program is achieved by a flow template. The flow template is prepared in advance for each application and has one or more arithmetic blocks in which a flow template parameter designated by the user is set. The dashboard is also enabled by the template. The dashboard template has one or more display parts to which a dashboard template parameter designated by the user is set. The dashboard template parameter is, for example, various kinds of information such as a dashboard name, a device name, a numerical value, and a unit variable name. The unit variable is a variable for holding the execution result of the flow by the analysis unit 4b.

<Functions Achieved by CPU of Basic Unit>

Figure 5:
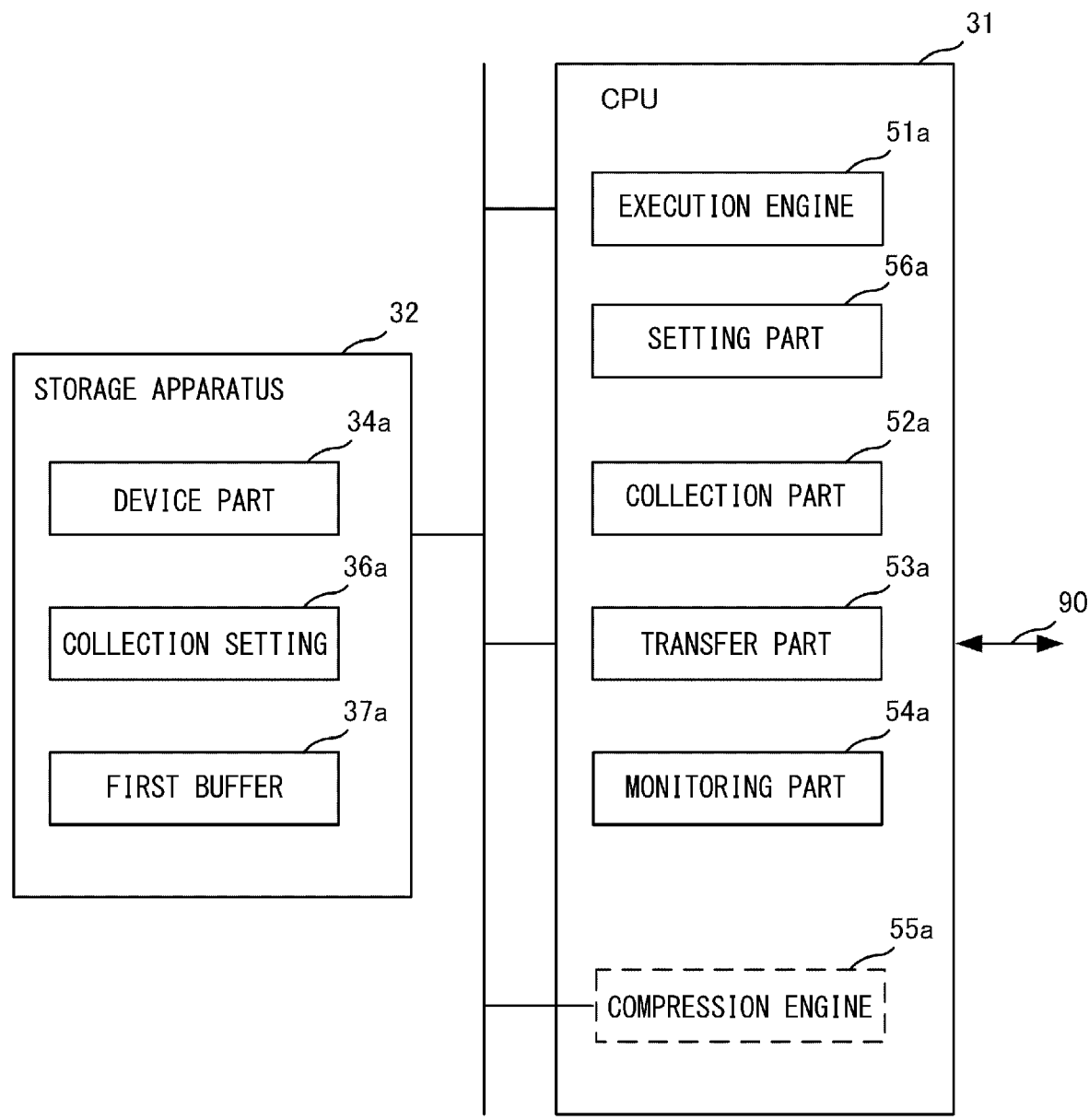
FIG. 5 is a diagram for explaining a basic unit.

FIG. 5 shows the functions achieved by the CPU 31 for data utilization. An execution engine 51a repeatedly executes a user program for each scan cycle which is an execution cycle. The execution engine 51a may be achieved by an ASIC, an FPGA, or the like, provided outside the CPU 31. ASIC is an abbreviation of application specific integrated circuit. FPGA is an abbreviation of field programmable gate array. These dedicated circuits can often execute specific data processing at a higher speed than a combination of a CPU and a program. A setting part 56a makes various settings in accordance with information having been input via the PC 2a. Note that some of the setting functions of the setting part 56a overlap with a setting part 71 of the analysis unit 4b which will be described later. That is, the setting may be made from any unit and can be made via the PC 2b connected to the analysis unit 4b.

The collection part 52a collects the device value to be collected from the device part 34 for each scan cycle, which is an execution cycle, and optionally collects characteristic amount data from the camera input unit 4a in synchronization with the scan cycle or asynchronously to create a data record and store the data into the first buffer 37a. The collected data is held as the operation record of the PLC 1 as described above and becomes history data for detailed analysis when the saving condition is satisfied. In a case where the execution engine executes the ladder program as the user program, the scan cycle of the ladder program corresponds to the execution cycle, and in a case where the execution engine executes the motion program as the user program, the control cycle of the motion program corresponds to the execution cycle. In a case where the device value and the characteristic amount data described above are collected for each scan cycle of the ladder program, the device value to be collected may be collected from the device part 34 during the end processing period in the scan cycle, and a data record may be created and stored into the first buffer 37a. Note that it is not essential to collect data during the end processing period, and the user program executed by the execution engine 51 may include a description of a program code such as a trigger instruction for collecting data. However, in a case where the data is collected by the end processing, there is an advantage that the creation of the user program is unnecessary. A collection cycle is set by the user, transferred as part of the project data, and stored in the storage apparatus 32 of the basic unit 3 as a collection setting 36a. The collection setting 36a includes not only the collection cycle but also a device to be a collection target. Note that the collection cycle may be a cycle different from the scan cycle that is the execution cycle, or the control cycle of the motion program. In this case, for each collection cycle specified by the collection setting 36a, the device value to be collected and the characteristic amount data may be collected from the device part to create a data record, and a data record may be created and stored into the first buffer 37a. Note that the characteristic amount data may be collected in synchronization with the collection cycle, may be collected asynchronously, or may be collected in both. Here, the basic unit 3 or the analysis unit 4b may analyze characteristics, such as a cyclic property and continuity, of each device value at the time of data collection and classify the devices in accordance with the analysis result. On the other hand, such analysis may not be performed at the time of data collection but may be performed by the basic unit 3 or the extension unit 4b at the timing when time-series data of each of a predetermined number of scan cycles has been collected or when it is necessary to analyze the data at the time of occurrence of an abnormality.

By providing the first buffer 37a, the execution engine 51a is less susceptible to an increase in scan time due to collection or transfer processing. The device value to be collected is designated by the collection setting 36a. The collection settings 36a may be stored into the basic unit 3 by the PC 2a or the analysis unit 4b. A transfer part 53a stores one or more data records stored in the first buffer 37a into the memory card 44 provided in the basic unit 3 and transfers the data records saved in the memory card 44 to the analysis unit 4b. As described above, the data record is saved into the memory card 44 when the saving condition is satisfied. Hence it is not necessary to transfer unnecessary data to the analysis unit 4b, thereby making it possible to achieve a reduction in the weight of communication traffic and a reduction in the amount of data occupied by the memory card. Note that the transfer part 53a executes transfer processing when the communication traffic in the extension bus 90 is free, but an extension bus dedicated to transmitting a data record to the analysis unit 4b may be provided.

Alternatively, the transfer part 53a may transfer one or more data records stored in the first buffer 37a to the analysis unit 4b via the extension bus 90, and the transferred data may then be stored into a memory card provided in the analysis unit 4b. In this case, it is preferable to provide an extension bus dedicated to transmitting a data record to the analysis unit 4b.

The transfer processing may be executed while avoiding the input/output refresh period or a period in which data is read from the buffer memory of the extension unit 4 in accordance with a read command described in the user program. Note that the communication traffic of the extension bus 90 is monitored by a monitoring part 54a. For reducing the data record transfer time, a compression engine 55a may compress a plurality of data records. Note that the compression engine 55a need not be achieved by the CPU 31 but may be achieved by an ASIC or an FPGA. Thus, by adopting the first buffer 37a, the transfer processing and the user program can be executed asynchronously.

<Functions of Analysis Unit>

Figure 6:
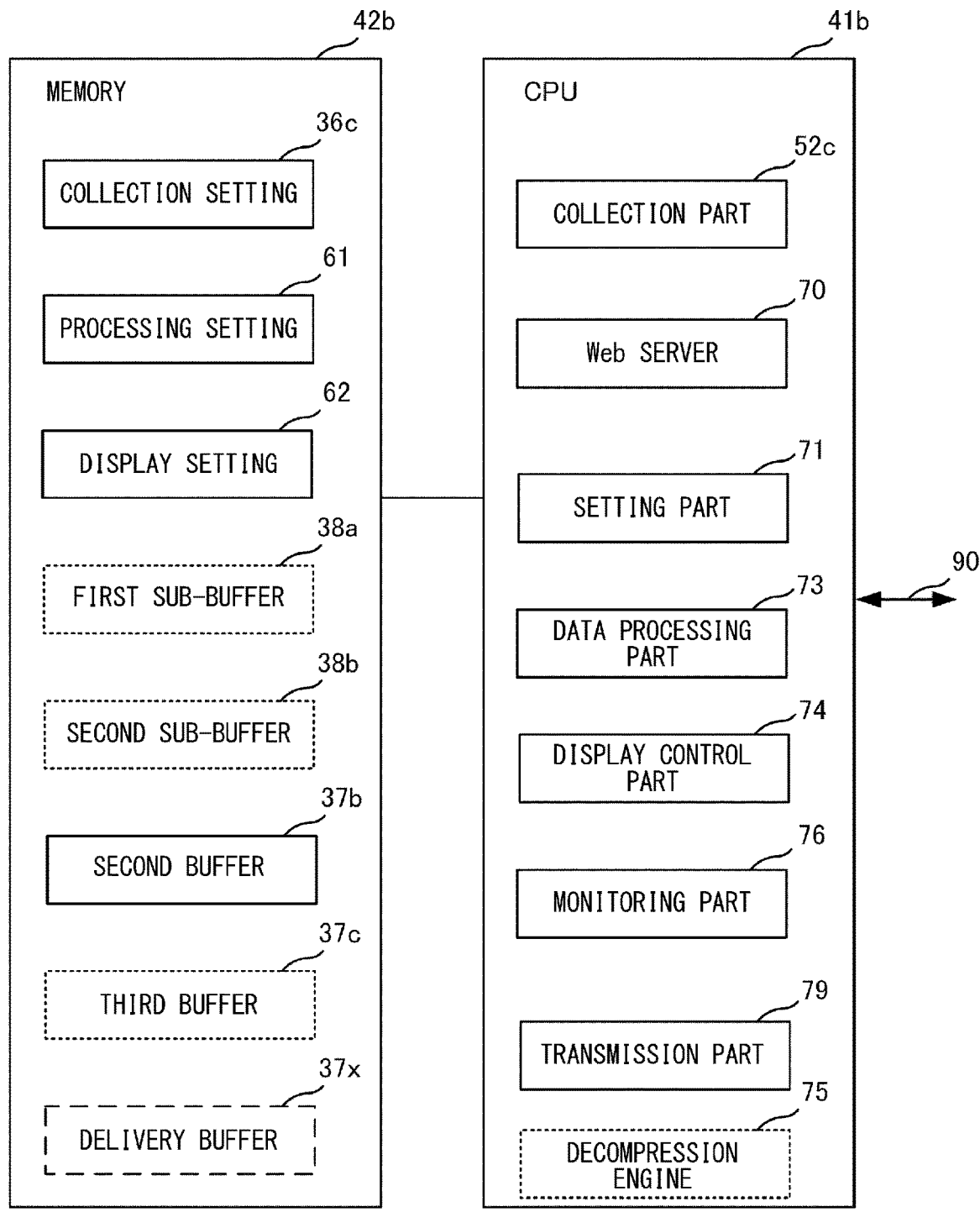
FIG. 6 is a diagram for explaining an analysis unit.

FIG. 6 is a diagram for explaining functions achieved by the CPU 41b of the analysis unit 4b.

The collection part 52c acquires data from the first buffer 37a or the memory card 44 of the basic unit 3 at the analysis timing of the operation record analysis in accordance with the collection setting 36c and collects a device value from each device to be monitored including the camera input unit 4a during the constant monitoring. Note that the collection part 52c may collect the device value of the device memory collected in the basic unit 3 during the constant monitoring. The collection setting 36c is a setting for collecting or acquiring data to be used for analysis in the analysis unit 4b. The collection setting 36c is set by the user via the PC 2a or the PC 2b, is transferred as a part of the project data, and is stored into the memory 42b of the analysis unit 4b. The collection part 52c can be achieved by the CPU 41b executing the control program such as the user program. The collection part 52c may set the basic unit 3 so that the basic unit 3 collects a device value specified by the collection setting 36c as history data of the operation record and transfers the device value to the second buffer 37b of the analysis unit 4b, and the collection part 52c may set each unit so that the analysis unit 4b collects a device value of a predetermined device to be monitored during the constant monitoring and characteristic amount data from the camera input unit 4a. Note that the collection part 52c may write the collection setting 36a of the basic unit 3, included in the collection setting 36c, into the storage apparatus 32 of the basic unit 3.

The collection part 52c collects, in accordance with the collection setting 36c, the devices value of one or more devices designated in advance and characteristic amount data indicating the characteristic amount of the camera image from the camera input unit 4a during the constant monitoring. The analysis unit 4b collects data to be monitored in this manner, so that the real-time performance can be improved. On the other hand, at the timing of the operation record analysis, the collection part 52c obtains data collected in the first buffer 37a of the basic unit 3 and saved into the memory card 44. Thus, by using the history data of the operation records before and after the detection of a state difference from usual during the constant monitoring, the factor analysis can be performed. Specifically, when the operation record analysis is performed, the device value and the like collected by the basic unit 3 in accordance with the collection setting 36a are transferred from the basic unit 3 to the analysis unit 4b in accordance with a timing at which the analysis unit 4b performs the analysis. When the characteristic amount data is not collected in the first buffer 37a of the basic unit 3 together with the device value as the history data of the operation record, the analysis unit 4b generates the characteristic amount data in its own unit from the image data held in the camera input unit 4a. The characteristic amount data may be generated in any of the camera input unit 4a, the analysis unit 4b, or the basic unit 3. For example, the analysis unit 4b and the basic unit 3 generate the characteristic amount data by using the image data of the camera image held in the camera input unit 4a at the timing of the operation record analysis. Therefore, when the analysis unit 4b and the basic unit 3 are to generate the characteristic amount at the time of performing the operation record analysis, the new characteristic amount can be generated and analyzed under monitoring conditions different from those for the characteristic amount monitored in the constant monitoring, and the factor analysis when a change different from usual is detected in the constant monitoring can be analyzed in detail. On the other hand, when the characteristic amount is to be generated in the camera input unit 4a and saved as an operation record, the configuration of the analysis unit 4b can be shared between the constant analysis and the operation record analysis to reduce the design cost. In addition, the characteristic amount for which a change different from usual has been detected in the constant analysis can also be used in the operation record analysis as it is, and a processing load for newly generating the characteristic amount can be reduced.

By providing the second buffer 37b and the third buffer 37c, data can be collected without dropping even when the processing load of the data processing part 73 fluctuates. The collection part 52c may write the collection setting for collecting data from the camera input unit 4a, included in the collection setting 36c, into the memory 42b of the analysis unit 4b. Note that these setting functions may be achieved by a setting part 71. The setting part 71 receives the collection setting 36c, a processing setting 61, and a display setting 62 from the PC 2a or the PC 2b and writes the received settings into the memory 42b. The processing setting 61 includes information and a flow program for defining data processing to be executed on the collected data by the data processing part 73. The display setting 62 includes a dashboard template (HTML data, CSS, JavaScript (registered trademark) code, etc.) that provides a data processing result to the web browser 18 through a web server 70.

In addition, the CPU 41b of the analysis unit 4b achieves a display control part 74, a monitoring part 76, and a transmission part 79 as a functional configuration. The monitoring part 76 monitors the time-series data of each device collected by the collection part 52c and the characteristic amount data generated by the camera input unit 4a and monitors a change different from usual. The monitoring part 76 basically executes, as constant monitoring, the monitoring processing in a predetermined cycle in accordance with the monitoring timing defined by the device value of the device memory, as described above, but "constant" may be applied in various modes. For example, the constant monitoring may be achieved in a real-time mode, a continuous mode, a scan time level (scan cycle) mode. These modes may be changed in accordance with the required level of safety performance, the processing ability of the PLC 1, and settings of an administrator. Although the monitoring part 76 monitors data different from usual, during the constant monitoring, the monitoring part 76 may determine data as different from usual when detecting a change by a predetermined amount or more in comparison with, for example, previously acquired data or an average value in a predetermined range, or may determine an abnormality determination parameter from the time-series data at the normal time, learn in accordance with the determined parameter, and input the collected data into the learned model to determine the data as different from usual data. The learning may be performed using teacher data including time-series data at the normal time and time-series data having abnormal data to generate the learned model. The learned model once generated is preferably updated by additional learning of the learning data and the teacher data so as to cope with a change over time and to improve the accuracy in abnormality detection. Instead of learning of the intentionally created teacher data, a location which seems to be normal, a location which seems to be abnormal, and a location not used for learning may be extracted from the constantly collected data, and learned automatically. In this case, when a cyclic change is involved, it is preferable that for each cycle, a portion in which the difference between values is within a certain range is determined as normal for each cycle, extracted, and learned. When the intentionally created teacher data is learned, there is an advantage that similar teacher data can be used in a plurality of different systems, and similar teaching data can be used each time to learn a somewhat predicted operation. On the other hand, when the additional learning is performed automatically, there is an advantage that it is possible to deal with a change over time in the system. In consideration of these advantages, it is preferable that the learning be appropriately switched by the administrator or the like. Therefore, the administrator or the like can perform the setting for switching the learning method via the PC 2a or the PC 2b.

The display control part 74 substitutes the data processing result into the template of the dashboard in accordance with the display setting 62 that defines the display parts of the dashboard to generate the display data of the dashboard. The display control part 74 also creates display data for displaying the monitoring result on the basis of the monitoring result by the monitoring part 76. The display data may be, for example, HTML data, image data, cascading style sheets (CSS), a JavaScript (registered trademark) code, or the like. The display parts include, for example, a camera image and pie chart parts, bar graph parts, line graph parts, numerical display parts, or the like, indicating characteristic amount data which is the characteristic amount of the camera image, When the web page of the dashboard is accessed by the web browser 18, the web server 70 transmits the display data of the dashboard to the web browser 18. The web browser 18 receives the display data and displays the display data in the dashboard. The transmission part 79 transmits the display data generated by the display control part 74 to the external apparatus. No particular limitation is imposed on the communication line and communication method used at the time of transmission. A wireless connection or wired connection may be used. The display control part 74 may display a result screen generated on the display provided in the analysis unit 4b.

Note that a plurality of analysis applications, such as an analysis application for each device value and an analysis application for characteristic amount data from the camera input unit 4a, may be provided. In this case, the required data and read timing may be different for each analysis application, and a sub-buffer may be ensured in the memory 42b for each analysis application. The collection part 52c reads the data record stored in the second buffer 37b and stores the data for a first analysis application in the first sub-buffer 38a. The collection part 52c reads the data record stored in the second buffer 37b and stores the data for a second analysis application into a second sub-buffer 38b. Note that the collection part 52c may read the data record stored in the third buffer 37c and store the data for the first analysis application into the first sub-buffer 38a. The collection part 52c may read the data record stored in the third buffer 37c and store the data for the second analysis application into the second sub-buffer 38b. The data processing part 73 reads data from the first sub-buffer 38a in accordance with the first analysis application, executes data processing, and generates a processing result. The data processing part 73 reads data from the second sub-buffer 38b in accordance with the second analysis application, executes data processing, and generates a processing result. A decompression engine 75 is a function paired with the compression engine 55a of the basic unit 3 and a compression engine 55b of the analysis unit 4b. The decompression engine 75 decompresses the data compressed and transferred by the basic unit 3 and stores the data into the second buffer 37b. The decompression engine 75 decompresses the data compressed and transferred by another extension unit and stores the data into the third buffer 37c. This will reduce the congestion of the communication traffic of the extension bus 90. The decompression engine 75 may be achieved by an ASIC or FPGA.

As thus described, the data transmission between the basic unit 3, the camera input unit 4*a*, the analysis unit 4*b*, and the extension unit 4*c* is executed via the extension bus 90.

Figures 7, 8:
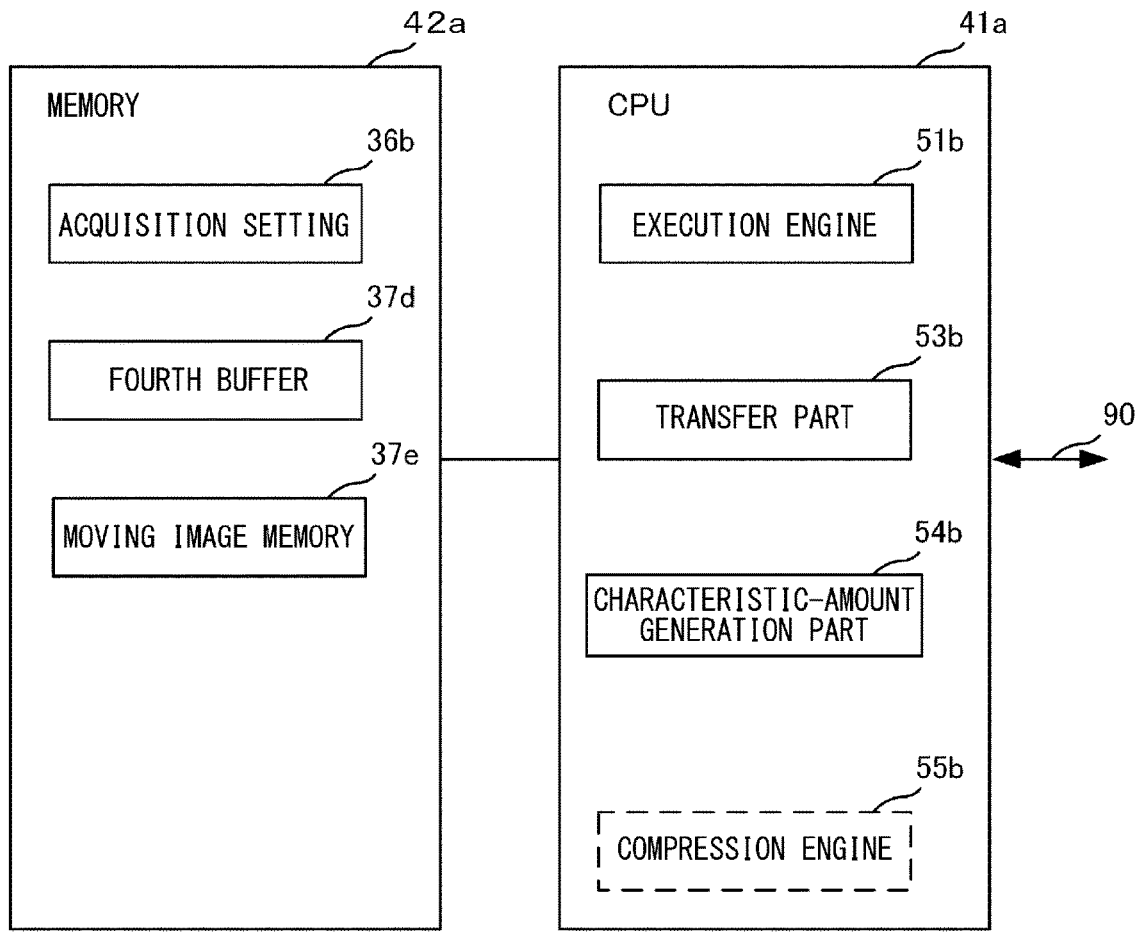
FIG. 7 is a diagram for explaining an extension unit.
FIG. 8 is a diagram for explaining a format of data records.

There may be a case where a plurality of pieces of data are required for each analysis application. In that case, a plurality of pieces of data necessary for the sub-buffer may be stored while all pieces of data collected by each scan are maintained in the ring buffer. Further, when data is distributed to the sub-buffer as well, a timestamp or the like may be given to each record. As shown in FIG. 8, the second buffer 37*b* or the third buffer 37*c* holds a block of collected data. Although an example is shown here in which data relating to the device value of each device is held, it is also assumed naturally that characteristic amount data from the camera input unit 4*a* is held. One record includes a scan number, a timer value as a time stamp, and collected data. The collected data includes, for example, devices Dev1, Dev2, and Dev10 shown in FIG. 8 and data such as relays RL1 to RL3. The first analysis application requires the relays RL1 to RL3 of the collected data. Therefore, the scan number, the timer value, and the relays RL1 to RL3 are read from the second buffer 37*b* and stored into the first sub-buffer 38*a*. The first analysis application reads the scan number, the timer value, and the relays RL1 to RL3 from the first sub-buffer 38*a* to create display screen data. The second analysis application requires the relays RL3 and the devices Dev1, Dev2 of the collected data. Therefore, the scan number, the timer value, the relay RL3, and the devices Dev1, Dev2 are read from the second buffer 37*b* and stored into the second sub-buffer 38*b*. The second analysis application reads the scan number, the timer value, the relay RL3, and the devices Dev1, Dev2 from the second sub-buffer 38*b* to create display screen data. By utilizing the sub-buffer in this manner, the original data can be maintained in the buffer without being changed. The original data held in the buffer becomes available for other purposes.

<Function of Extension unit 4*a* Relating to Camera Input>

FIG. 7 is a diagram for explaining a function achieved by the CPU 41*a* of the camera input unit 4*a* to which the camera sensor 10, which is a field device, is connected. Note that the configuration of the extension unit 4*c* to which the field device 19 such as a sensor and a switch is connected is substantially the same as the configuration of the camera input unit 4*a*, and hence the description thereof is omitted. The extension unit 4*c* is different in that the extension unit 4*c* does not include a characteristic-amount generation part 54*b* and a compression engine 55*b* of the camera input unit 4*a*, which will be described later, and is different in the functional configuration inside the memory.

The execution engine 51*b* acquires and saves the captured image of the camera sensor 10, which is the basic function of the camera input unit 4*a*. The execution engine 51*b* sequentially acquires image data of the camera image from the camera sensor 10 which sequentially takes the image in accordance with the imaging conditions, saves the image data into the moving image memory 37*e*, and saves the characteristic amount data indicating the predetermined characteristic amount of the captured image, sequentially generated from the image data by the characteristic-amount generation part 54*b*, into a fourth buffer 37*d*. Details of the characteristic amount data will be described later. The data stored into the fourth buffer 37*d* may be transferred to the analysis unit 4*b* as data for constant monitoring during the constant monitoring and may further be transferred to the basic unit 3 as history data for operation recording.

The image data stored into the moving image memory 37*e* is transferred to the basic unit 3 or an extension unit having a Web server, for example, an analysis unit 4*b*, as necessary. The image data is used to generate characteristic amount data at the transfer destination or to display a monitor image on a confirmation screen. Thus, an operator of the PLC system can confirm the moving image to be taken with the monitor image. For example, the characteristic amount data may be transferred to the analysis unit 4*b* in accordance with the scan cycle, while the image data may be transferred to the basic unit 3 or the analysis unit 4*b* at a timing different from the above timing. In addition, when the image data itself is used only for display on the monitor image and not for generation of the characteristic amount data, the amount of data is preferably reduced by thinning out the data out since the data is not the data to be monitored. This enables a reduction in the volume of communication between the respective units. For example, the execution engine 51*b* may detect a timing at which the communication traffic of the extension bus 90 is small, and the transfer part 53*b* may transfer the image data of the camera image.

The characteristic-amount generation part 54*b* generates the characteristic amount data, obtained by extracting a predetermined characteristic amount from image data acquired by a camera sensor 10, and the generated characteristic amount data is saved into the fourth buffer 37*d*. At the timing for generating characteristic amount data, the characteristic amount data is generated basically in accordance with a monitoring timing, defined by the device of the device memory, during the constant monitoring, but may be generated in accordance with the scan cycle of the device value depending on an image acquisition cycle of the camera sensor or the like. Also, since the scan cycle is normally shorter than the image acquisition cycle of the camera sensor 10, there is no camera image corresponding to the scan cycle. Therefore, an analysis synchronized with the scan cycle is made possible by analyzing characteristic amount data generated by the latest photographing. In this case, the same characteristic amount data may be used in a plurality of scan cycles. For example, it is assumed that in a period in which four scan cycles come, the camera sensor performs acquisition once, and in such a case, the characteristic amount data from the same camera image corresponds in the four scan cycles. As thus described, the characteristic amount data is generated in accordance with the scanning cycle, and the relationship with other device values is analyzed, whereby the accuracy in detection of a device different from usual can be improved. Note that this is not intended to limit the present subject matter, and the characteristic amount data may be generated at other timings. Further, the characteristic-amount generation part 54*b* generates characteristic amount data obtained by extracting a characteristic amount of at least a partial range (predetermined region) of the camera image taken by the camera sensor 10. The range will be described in detail later but corresponds to a region set by the operator in the camera image displayed on the setting screen. That is, the range can be changed by the operator from the PC 2*a* connected to the basic unit 3, the PC 4*b* connected to the analysis unit, the PC connected to another extension unit, and the like. When the range is changed, a coordinate value corresponding to the range changed is notified to the camera input unit 4*a* from the basic unit 3 or the analysis unit 4*b* via the extension bus 90, and the characteristic-amount generation part 54*b* changes the subsequent extracted region of the characteristic amount in accordance with the notified contents.

The compression engine 55b compresses the data records in accordance with the collection settings 36. That is, the transfer part 53b may transfer the data record, subjected to information compression by the compression engine 55b, to the basic unit 3 and the analysis unit 4b. The compression engine 55b may be achieved by the CPU 41a, but may be achieved by an ASIC or an FPGA from the viewpoint of high-speed processing and a reduction in the processing load of the CPU 41a.

<Example of Data Record>

FIG. 8 shows a data record 91 written by the collection part 52a into the first buffer 37a. Here, a case where data collection is performed as an operation record of the PLC 1 by the basic unit 3 will be described as an example, but the same applies to a case where the analysis unit 4b during the constant monitoring collects a device value and the like from each unit. The plurality of data records 91 are examples of time-series data. In this example, the collection part 52a collects device values of device names Dev1, Dev2, Dev10 from a device part 34a for each scan cycle, adds time information acquired from a collection count and a timer to create one data record, and stores the data record into the first buffer 37a. Note that the collection target may be data stored in a buffer memory or a device allocated to the analysis unit 4b. In this example, the first buffer 37a is a first-in first-out (FIFO) type buffer. The collection count is a count value of a counter incremented by one every time one data record is collected. The collection count is a sequential number and is thus useful for detecting missing or compression of data records.

The time information such as a time stamp is useful, for example, at the time when data acquired by the basic unit 3 and data acquired by another extension unit are displayed in the dashboard in a contrastable manner. Generally, the collection timing in the basic unit 3 does not coincide with the collection timing in another extension unit. Thus, comparing the operation of the basic unit 3 with the operation of another extension unit requires information for associating the data of the basic unit 3 with the data of another extension unit. In general, time information can be synchronized between the basic unit 3 and another extension unit by inter-unit synchronization or the like. Therefore, the basic unit 3 and another extension unit each gives time information at the time when the data record is collected to the data records, so that the data processing part 73 can align a plurality of data records acquired by different units on the time axis. Further, before performing the analysis, the data processing part 73 executes preprocessing for cutting out the characteristic amount data of the camera image to be analyzed by association with a change in a device value of a predetermined device. For the preprocessing, it is assumed that the time-series data of the device value and the time-series data of the characteristic amount data are synchronized.

In a case where the characteristic amount data from the camera input unit 4a is also collected in synchronization with the scan cycle, the characteristic amount data may be collected in synchronization with a collection counter in the same manner or may be collected intermittently in consideration of the image acquisition cycle of the camera sensor 10, the memory resources of each unit, and the like. Also, since the scan cycle is normally shorter than the image acquisition cycle of the camera, the camera image corresponding to the scan cycle is not obtained in most cases. In such a case, characteristic amount data indicating a characteristic amount generated by adopting an image taken most recently is collected. This enables the analysis in synchronization with the scan cycle. For example, the characteristic amount data may be collected every four counts of the collection count. Such collection timing can be changed by setting. By collecting the characteristic amount data of the camera image from the camera input unit 4a in synchronization with the scan cycle, the device and the camera image can be associated with each other and analyzed.

In a case where the characteristic amount data is collected asynchronously with the scan cycle, the data is collected with the timing of the scan cycle being shifted. In this case as well, the counter generated by the basic unit 3 at the time of the collection is recorded, and hence it is also possible to perform the analysis in association with the counter generated by the basic unit 3 associated with each device value. Further, the characteristic amount data of the camera image may be analyzed alone, and in that case, it may be analyzed whether or not there is a change in the characteristic amount of the region of interest between the characteristic amount data of the image taken last time and the characteristic amount data of the image taken this time. For example, when there is a change equal to or greater than a predetermined value, the change may be detected as a value different from usual, or when there is a change where no change should occur in the normal time or when there is a change in one cycle, the state may be detected as being different from usual. As thus described, when a state different from usual is detected at the time of analyzing the characteristic amount data alone, it may be considered that the above saving condition is satisfied. As described above, a log can be left in accordance with the saving condition, and data in the ring buffer can be saved into the memory card 44 of the basic unit 3 or into a memory card (not shown) provided in the analysis unit 4b. When the characteristic amount data of the camera image is a value within a certain range from or the same value as an analysis value obtained by the last analysis, it is not necessary to save the characteristic amount data, and the analysis by the analysis unit 4b is not necessary. By determining the change in the characteristic amount in the first stage in this manner, effective detect can be performed as to whether or not there is a change in the camera image. Although the device value of the predetermined device and the characteristic amount data of the camera input unit 4a are monitored during the constant monitoring, when a state different from usual is detected, the data of each of all the devices and the image data of the camera may be saved into the memory card 44 as history data of the operation record. It is thereby possible to identify the abnormal device and the abnormal factor easily and in detail.

<Transfer Timing>

Figure 9:
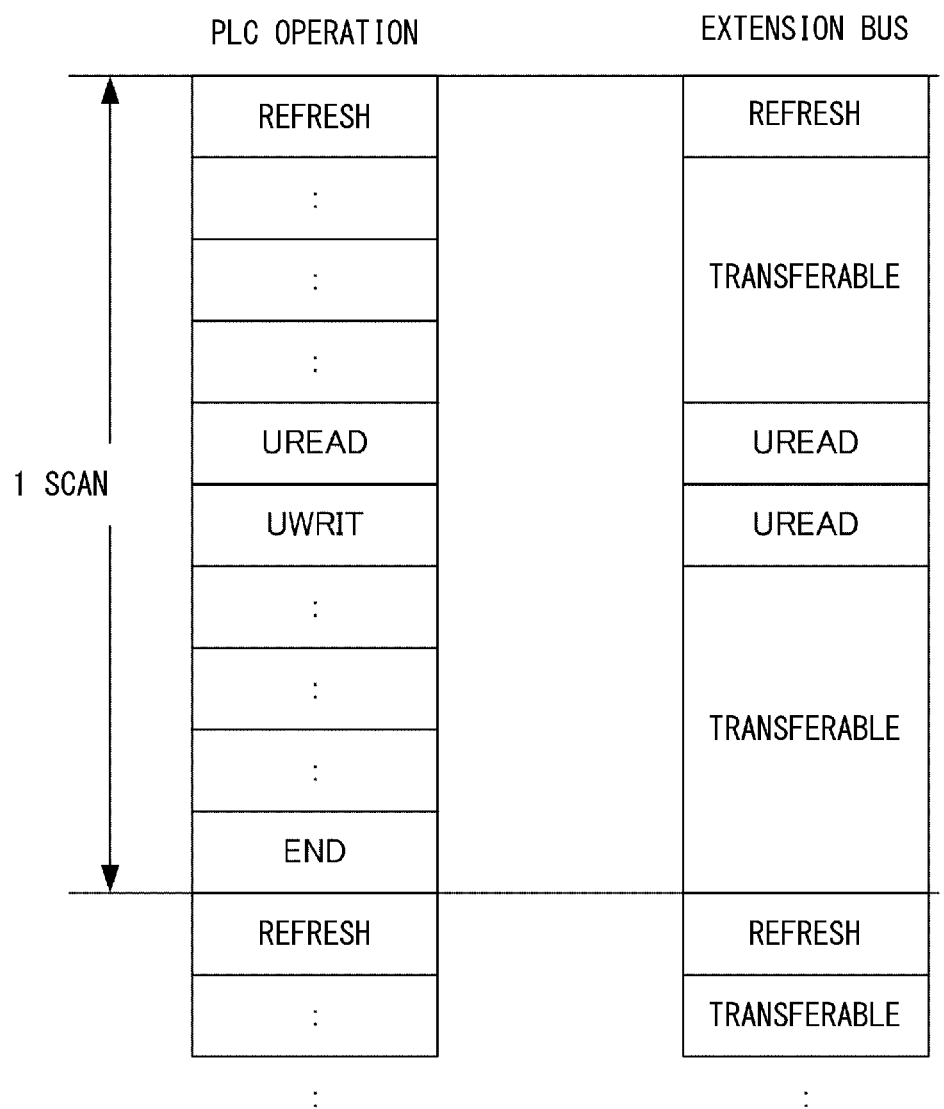
FIG. 9 is a diagram for explaining a transfer timing.

FIG. 9 is a diagram for explaining the transfer timing of the data record. As shown in FIG. 9, the PLC 1 repeatedly performs input/output refresh, execution of a user program, and end processing. In order to reduce the elongation of the scan cycle, the transfer processing between the basic unit 3 and the extension unit 4 is executed, avoiding a period for the input/output refresh. Similarly, in order to reduce the elongation of the scan cycle, the transfer processing is executed, avoiding the execution periods of UREAD and UWRIT. UREAD is a command to read data from the buffer memory allocated to the extension unit 4, and is described in the user program. Thus, during the execution period of the user program, the basic unit 3 accesses the extension unit 4 in accordance with UREAD to acquire data from the buffer memory. UWRIT is a command to write data into the buffer memory allocated to the extension unit 4 and is described in the user program. During the execution period of the user program, the basic unit 3 accesses the extension unit 4 in accordance with UWRIT and writes data into the buffer memory.

As shown in FIG. 9, the transfer processing is executed on the extension bus 90 during the remaining transferable period excluding the input/output refresh, UREAD, and UWRIT. For example, it is assumed that a setting has been made by the collection setting 36a to execute transfer processing for five data records at a time. In this case, the transfer part 53a executes the transfer processing after the accumulation of the five data records into the first buffer 37a is completed and in a first transferable period or at the timing when the transfer request is received by the camera input unit 4a. In the transferable period, the image data is transferred from the camera input unit 4a by using a period during which the transfer processing of the data records is not performed.

<Configuration Relating to Camera Image Analysis>

Figure 10:
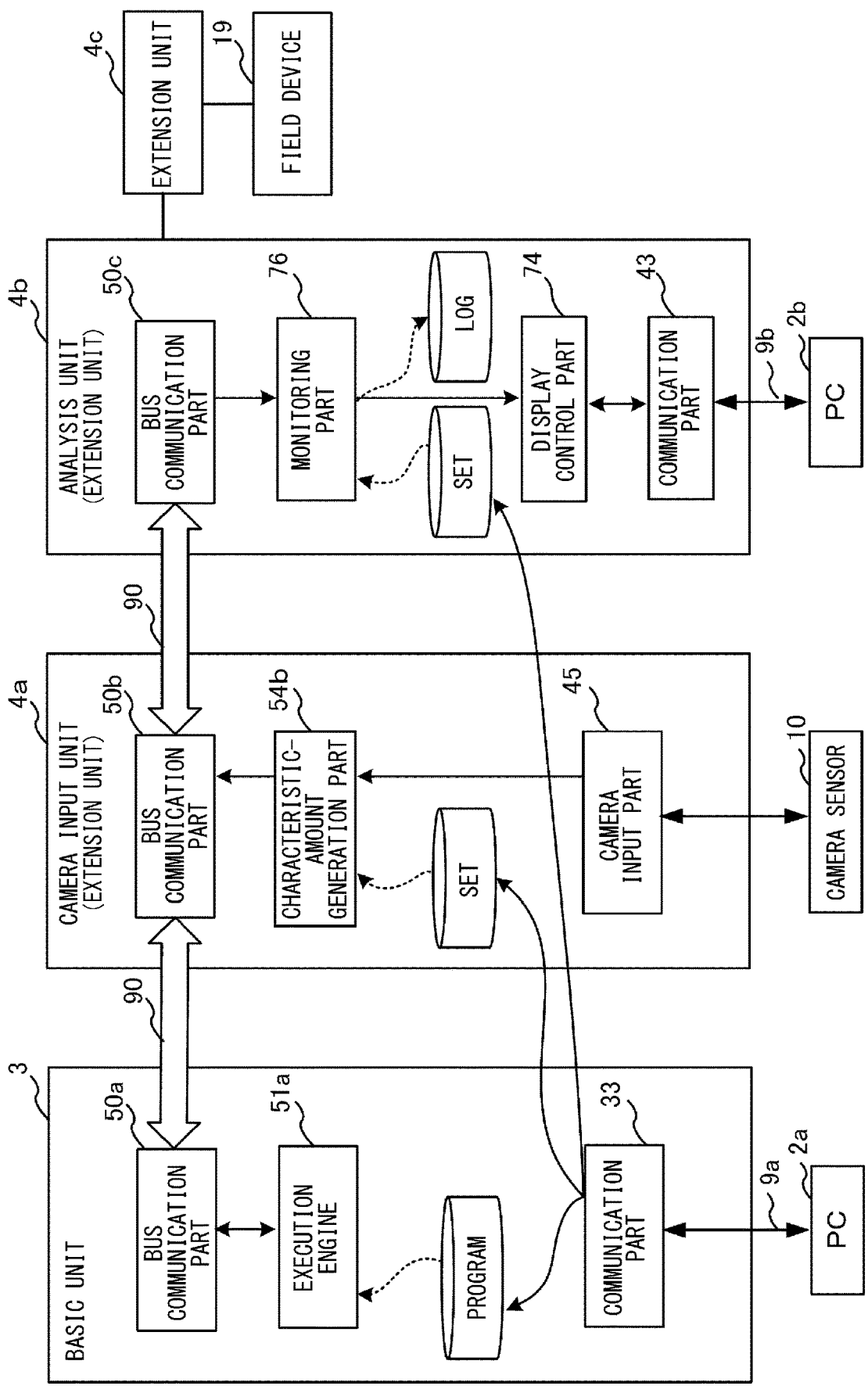
FIG. 10 is a diagram showing a configuration relating to camera image analysis in the PLC system.

FIG. 10 is a diagram showing a configuration relating to camera image analysis in the PLC system. In FIG. 10, the same reference numerals are given to constituents similar to the constituents of FIG. 4 showing the electrical configuration of the PLC system and the constituents of FIGS. 5 to 7 showing the functional configurations of the respective units. Here, a configuration for analyzing a camera image taken by the camera sensor 10 and displaying the result will be described with reference to FIG. 10. The units 3, 4a, 4b include bus communication parts 50a, 50b, 50c, respectively. The bus communication parts 50a, 50b, 50c can transmit and receive signals to and from each other via the extension bus 90. Note that the extension unit 4c also has these configurations, but the detailed configuration thereof is omitted here for easy description.

First, the camera sensor 10 takes a moving image of an object range, generates image data, and inputs the image data to the camera input unit 45. Any communication means can be applied to the transmission of the image data, and for example, dedicated communication or communication with a general-purpose network camera such as the Open Network Video Interface Forum (ONVIF) may be applied. The camera input unit 45 receives the image data from the camera sensor 10 and passes the image data to the characteristic-amount generation part 54b. Various settings can be made via the PC 2a or PC 2b for taking the image by the camera sensor 10. Examples of the setting items include automatic exposure correction, automatic white balance correction, contrast, sharpness, and image rotation. The automatic exposure correction is a setting of whether the brightness is automatically adjusted or fixed. The automatic white balance correction is a setting of whether the color is automatically adjusted or fixed. The contrast is a setting of the vividness. The sharpness is a setting of the contour intensity. The image rotation is a setting of the direction of the taken image. The image data to be acquired includes, for example, YUV, RGB, and JPEG. Naturally, other parameters can also be set, and the setting items vary depending on the performance of the camera sensor.

The characteristic-amount generation part 54b generates a characteristic amount relating to the amount of light received and luminance from image data which is image data. For example, the characteristic-amount generation part 54b extracts an average value within a predetermined region of at least one characteristic amount such as a luminance component, a color difference (blue) component, a color difference (red) component, an R component, a G component, a B component, and the degrees of change thereof from image data of a predetermined region of a camera image, and an average value of a gradient strength, an angle, and the like, from an image data of a predetermined region, and the characteristic-amount generation part 54b stores the average value into the fourth buffer 37d as characteristic amount data. The range of the predetermined region can be set via the setting screens displayed on the PCs 2a, 2b. Details of the setting screens will be described later. Thereafter, the characteristic amount data is collected from the camera input unit 4a to the basic unit 3 or the analysis unit 4b through the bus communication part 50b together with each device value in synchronization with the scan cycle and is used for analysis in the analysis unit 4b. As described above, the characteristic amount data may be collected asynchronously for the scan cycle. The bus communication part 50b also transfers the image data of the camera image taken by the camera sensor 10 to the basic unit 3 or the analysis unit 4b via the extension bus 90 in the transferable period.

The device value of each device, the characteristic amount data of the camera image, and the image data collected by the basic unit 3 as operation records, are transferred to the analysis unit 4b via the extension bus 90. When the data of each of these operation records is transferred or when the characteristic amount data or the device values are acquired during the constant monitoring, the monitoring part 76 of the analysis unit 4b monitors the time-series data and the characteristic amount data of each of these device values, monitors a change such as a value different from usual, and detects an abnormality. With respect to the characteristic amount data of the camera image, for example, when the characteristic amount of the monitoring target is a luminance component, the monitoring part 76 monitors whether or not the average value of luminance for each cycle exceeds a predetermined threshold and detects an abnormality. The monitoring part 76 preferably holds the monitoring results as log information into a memory card (not shown) connected to the memory 42b or the analysis unit 4b. Although the log information is preferably held in a non-volatile memory, a volatile memory may be used when the monitoring is performed only during energization.

The display control part 74 generates a confirmation screen indicating a monitoring target by the monitoring part 76 and displays the confirmation screen on the Web browser of the PCs 2a, 2b, or other apparatuses. The confirmation screen may also be displayed on the display of the basic unit 3 or the extension unit 4. The confirmation screen displays time-series data of the characteristic amount as the monitoring target, time-series data of the device value synchronized with the time-series data of the characteristic amount, the current state of the camera image, and the monitoring result. The monitoring result includes, for example, the number of times of occurrence of NG indicating the number of times an abnormality is determined. These displays are selected in accordance with the performance of the display used for the displays. Details of the confirmation screen will be described later.

The PC 2a connected to the basic unit 3 can reflect, through the setting part 56a, the user program executed by the execution engine 51a, the setting of the characteristic-amount generation part 54b, and the setting of the monitoring part 76 to each unit via the communication part 33. For example, the setting part 56a checks the flag of each setting content, determines each setting destination, and performs writing. Thus, the setting is written from the basic unit 3 to each extension unit 4. Note that the setting of the characteristic-amount generation part 54b and the setting of the monitoring part 76 may be performed via the PC 2b. The setting of the characteristic-amount generation part 54b is provided in the camera input unit 4a which is the extension unit 4 different from the analysis unit 4b to which the PC 2b is connected, so that the setting contents having been input are notified via the extension bus 90 which is the internal bus. The data that can be set by the PC 2b is limited, and the collection setting, the acquisition setting, the setting of each device, especially the setting relating to the camera sensor 10, and the monitoring setting can be performed, but the project data including the user program to be executed cannot be transferred to each unit via the PC 2b In order to enable setting from the Web server such as the PC connected to the extension unit as thus described, it is necessary to consider a conflict with setting from the PC 2a connected to the basic unit 3. Thus, in addition to the buffer memory, each extension unit is preferably provided with a temporary write memory for temporarily holding the received setting contents. The setting from the Web server is temporarily written to a temporary write memory and then rewritten to a buffer memory. At the time of rewriting, it is confirmed whether the setting content to be newly updated is data within a defined range or whether rewriting is not prohibited. The defined range has a fixed value as an initial setting or a system by the project data in advance. Further, by providing the temporary write memory, it is possible to receive a setting change even during the execution of the monitoring processing. It is also possible to temporarily hold the data in the temporary write memory and to write the data after waiting for the end of the monitoring processing. Note that the present subject matter is not limited to such a configuration having a separate memory, and the setting data may be temporarily saved in a memory in the PC connected to the Web server, and it may be confirmed whether the data is within a defined range or whether rewriting is not prohibited, or the buffer memory may be divided into a plurality of portions and have the portion for temporary writing as described above. The difference between the PCs 2a, 2b will now be described. There is a difference in the operation authority between the user of the PC 2a and the user of the PC 2b, and the operator of the PC 2b can change only some of the setting. The PC 2a is used at the initial start-up of the PLC 1, and the PC 2b is used at the start of operation or during the operation of the system. The PC 2a and the PC 2b may be a tablet terminal or the like. Note that the present subject matter is not intended to limit these matters and can be arbitrarily changed in accordance with the installation environment, specifications, and the like.

In the present embodiment, the description is given of the configuration in which the basic unit 3, the camera input unit 4a, the analysis unit 4b, and the extension unit 4c are separated. However, this is not intended to limit the present subject matter, and for example, these units may be integrally provided. That is, the basic unit 3 may have the functions of the camera input unit 4a, the analysis unit 4b, and the extension unit 4c. Alternatively, the basic unit 3 may have partial functions of the camera input unit 4a, the analysis unit 4b, and the extension unit 4c. The camera input unit 4a, the analysis unit 4b, and the extension unit 4c may be provided integrally.

<Camera Analysis Processing Flow>

Figure 11:
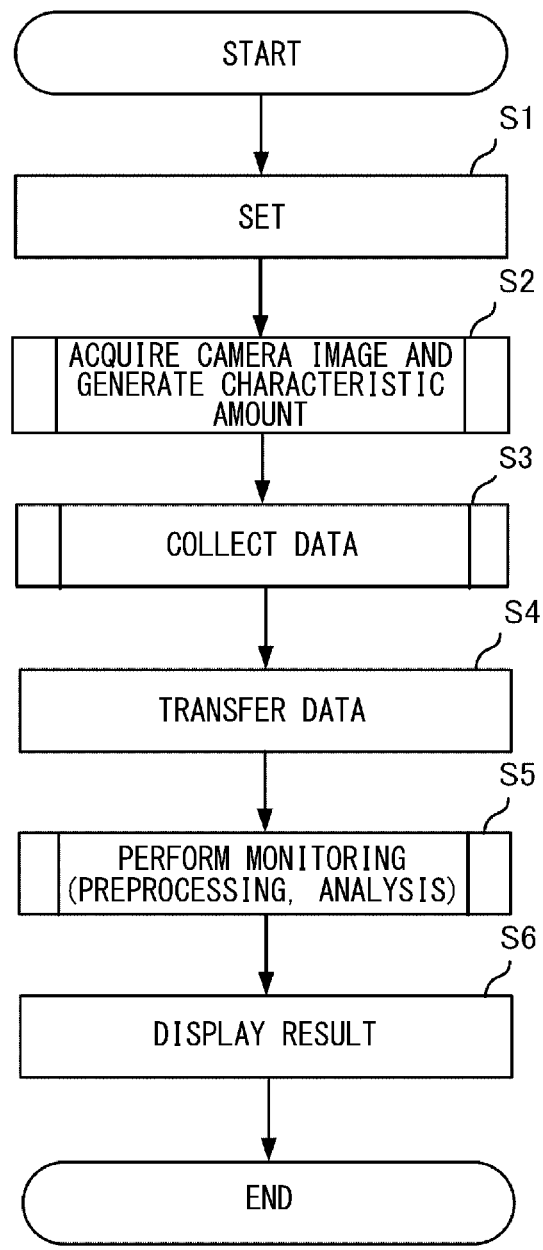
FIG. 11 is a flowchart showing a processing procedure of camera image analysis.

FIG. 11 shows a processing flow for acquiring and analyzing a camera image and displaying a result according to the present embodiment. The processing described below will be described as processing executed by the CPU 31 of the basic unit 3, the CPU 41a of the camera input unit 4a, and 41b of the analysis unit 4b. However, this is not intended to limit the present subject matter, and some of the processing may be executed in other units, or all of the processing may be executed in one unit or may be executed by an external apparatus (analysis apparatus) communicatively connected to the programmable logic controller.

In S1, the CPU 31 (setting part 56a) sets the collection setting 36a of the basic unit 3 in accordance with the information having been input via the PC 2a. For example, the CPU 31 stores into the storage apparatus 32 the collection setting 36a for the basic unit 3 and the collection setting 36a based on collection settings and acquisition settings acquired from the camera input unit 4a, the analysis unit 4b, and the collection setting 36a another extension unit. The collection setting stored into the storage apparatus 32 is, for example, a setting indicating to the basic unit 3 which device data is to be collected and transferred to the analysis unit 4b. The camera input unit 4a stores an acquisition setting 36b into a memory 42a. The analysis unit 4b stores the collection setting 36c into the memory 42b. These settings are settings indicating which device data is to be collected. For example, a setting is made such that, during the constant monitoring, the device value of a predetermined device is collected in the corresponding unit and transferred to the analysis unit 4b. Although the example has been described here in which the setting part 56a of the basic unit 3 performs setting independently, the present subject matter is not limited thereto, and the setting part 71 of the analysis unit 4b may perform setting independently. In this case, the setting part 71 performs setting in accordance with information having been input via the PC 2b and transfers the collection setting to other units. In addition, in S1, the CPU 41b (setting part 71) of the analysis unit 4b make camera settings such as photographing conditions, image processing settings, monitoring item settings, and the like in accordance with information having been input via the setting screen displayed on the display part 7b of the PC 2b. The setting screens for these will be described later. Note that the CPU 31 of the basic unit 3 may make these settings in accordance with information having been input via the setting screen displayed on the PC 2a.

In S2, the CPU 41a of the camera input unit 4a acquires a camera image (image data) taken by the camera sensor 10 in accordance with the content of the acquisition setting 36b set in S1 via the camera input unit 45. Here, the CPU 41a? temporarily stores the image data of the acquired camera image into the memory 42a. Further, the CPU 41a (characteristic-amount generation part 54b) extracts the characteristic amount of a predetermined region of the image data held in the memory 42a, and the analysis unit sequentially collects and accumulates the characteristic amount to generate time-series characteristic amount data. The characteristic-amount generation part 54b extracts a prescribed characteristic amount from a predetermined region in accordance with the setting contents via the setting screen. Although the characteristic amount of the type set via the setting screen is extracted here, basically, the extractable characteristic amounts are also extracted in addition to the characteristic amounts of the set types. The characteristic-amount generation part 54b associates the generated characteristic amount data with the counter (time stamp) and saves the associated data into the fourth buffer 37d. The detailed processing of S2 will be described later with reference to FIG. 13.

In S3, the CPU 31 (collection part 52a) collects, in accordance with the set collection setting 36a, the device value of each device to be collected and characteristic amount data indicating the characteristic amount of the predetermined region of the camera image taken by the camera sensor 10, and stores those into the first buffer 37a. As for the collection timing of the characteristic amount data, the characteristic amount data may be collected in synchronization with a scan cycle for collecting a device value or asynchronously. On the other hand, during the constant monitoring, the characteristic amount data is not collected in the basic unit 3 but is transferred from each unit to the analysis unit 4*b*, and an abnormality is detected in real time. Further, when an abnormality such as a state different from usual is detected in the image data saved in the moving image memory 37*e* of the camera input unit 4*a*, the CPU 31 may collect the image data of the camera image using the transferable period of the extension bus 90 and save the image data into the first buffer 37*a* and the memory card 44. Further, in the collection processing of S3, it is preferable to classify the device value of each device and the characteristic amount data of the camera image, that is, the collected time-series data of each of those collected, on the basis of the characteristics such as the cyclic property so that the analysis can be easily performed using a predetermined parameter in later analysis processing. Details of the processing will be described later with reference to FIGS. 23 to 24B.

In S4, the CPU 31 (transfer part 53*a*) saves the data collected in the first buffer 37*a* in S3 into the memory card 44 from the first buffer 37*a* in response to the saving condition being satisfied and transfers the time-series data, saved into the memory card 44, to the analysis unit 4*b* via the extension bus 90. For example, the transfer processing may be performed when a predetermined amount of collected data is stored in S3. That is, each time a sufficient amount of data (time-series data of a predetermined number of scan cycles) necessary for the monitoring processing by the analysis unit 4*b* is accumulated in the storage part such as the buffer or the memory card 44, the transfer processing is executed. Although the example has been described here in which the data collected from the first buffer 37*a* to the memory card 44 is temporarily saved and transferred to the analysis unit 4*b*, this is not intended to limit the present subject matter, and the data may be saved into a non-volatile memory different from the memory card, or the data may be transferred from the first buffer 37*a* to the analysis unit 4*b* without being saved into such a memory.

In S5, the CPU 41*b* (data processing part 73 and monitoring part 76) acquires time-series data of the device value of each device and characteristic amount data saved in the memory card 44 in the operation record analysis, and executes preprocessing and analysis processing on the acquired characteristic amount data. Further, during the constant monitoring, the CPU 41*b* further collects the device value of the predetermined device and the characteristic amount data from the camera input unit 4*a* and monitors a change different from usual. Here, the constant monitoring is basically performed in accordance with the monitoring timing defined by the device of the device memory but may be achieved at various levels such as a real-time, continuous, and a scan time level (scan cycle). The "abnormal" indicates that the device values and the characteristic amount data of the camera image to be analyzed are different from values at the normal time, that is, deviate from data at the normal time, and does not necessarily indicate an abnormality occurring in the programmable logic controller. Details of S5 will be described later with reference to FIGS. 14 to 16.

In S6, the CPU 41*b* (display control part 74) generates display data indicating the monitoring result on the basis of the monitoring result of the monitoring by the monitoring part 76 and displays the generated display data on the display part 5 of the basic unit 3 or transmits the generated display data by the transmission part 79 to the PC 2*b* or the external apparatus via the communication part 43. For example, the monitoring result is displayed to the operator in the PC 2*b*. Note that the setting of the monitoring item or the like can be changed via the displayed confirmation screen, and the display screen can be changed in real time in accordance with the setting change. Although the example in which a predetermined device value and characteristic amount data are constantly collected and constantly monitored has been described as a monitoring form in which constant monitoring is performed, but this is not intended to limit the present subject matter thereto. A method may be used in which monitoring is performed in a case where the device values previously determined by the user have changed in a predetermined manner, in which the device values are periodically monitored in a set cycle, or in which whether there is not an abnormality in the device values or the like is analyzed on the basis of a monitoring instruction from the user. Details of the processing of S6 and the confirmation screen will be described later.

<Characteristic Amount Data>

Figure 12:
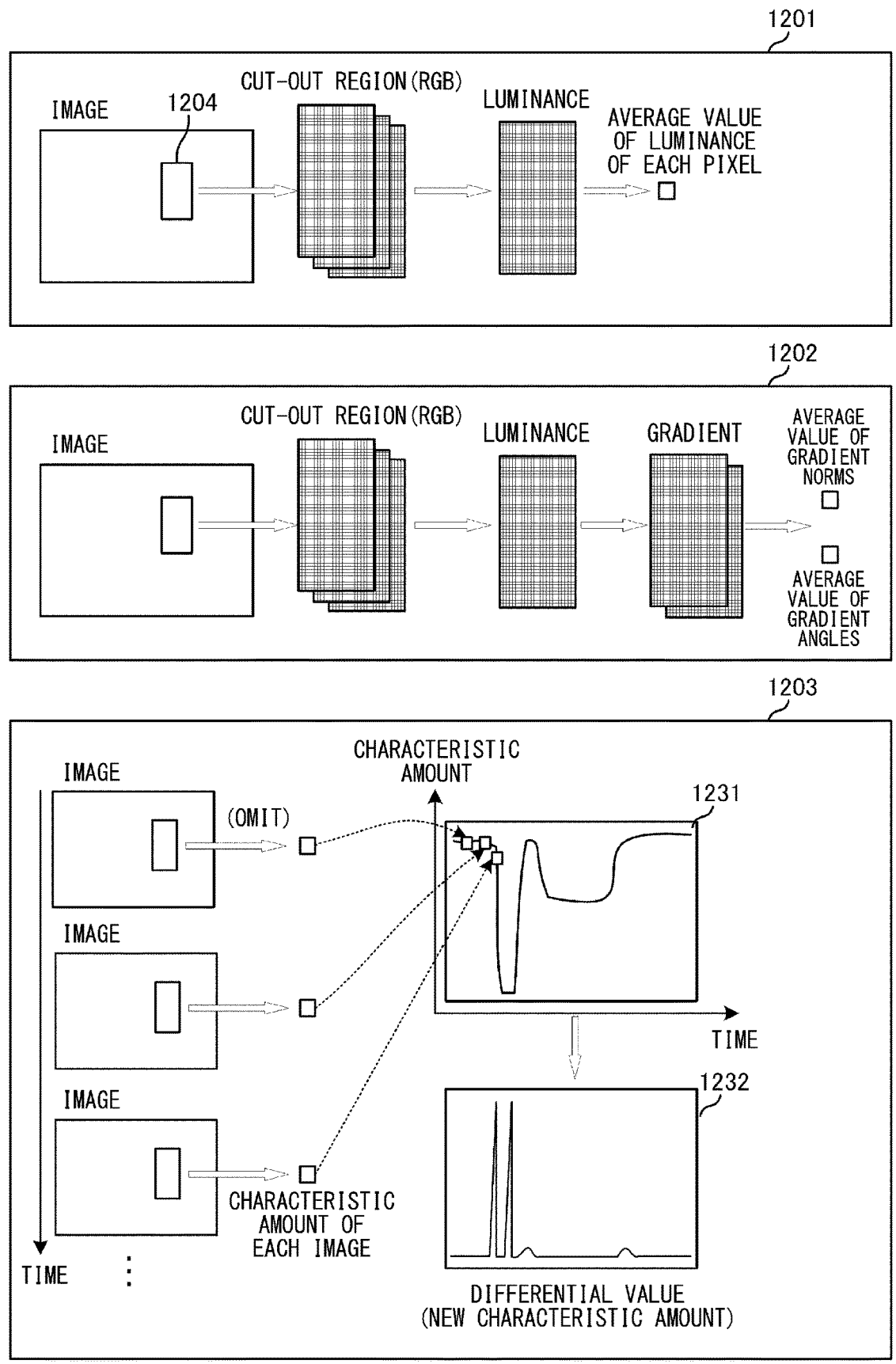
FIG. 12 is a view explaining how to extract a characteristic amount of camera images.

FIG. 12 is a diagram showing an example of a method for extracting a characteristic amount of a camera image according to the present embodiment. Here, a method for generating characteristic amount data for each type of characteristic amount will be described with reference to FIG. 12. Note that the method shown here is an example, and other arbitrary methods can be used in the present subject matter in accordance with the type of characteristic amount. In the present embodiment, an example of extracting a characteristic amount in one predetermined region in the camera image will be described, but the characteristic amounts of the entire camera image may be extracted, or the characteristic amounts of a plurality of regions may be extracted. The region as an extraction target may be changed for each type of characteristic amount. Examples of the type of characteristic amount include a luminance component, a color difference (blue) component, a color difference (red) component, an R component, a G component, a B component, and the degrees of change thereof.

Reference numeral 1201 denotes a method for acquiring an average value of characteristic amounts relating to luminance from image data for each pixel. First, the characteristic-amount generation part 54*b* divides the camera image into one or a plurality of areas, and specifies an area to be the target in accordance with the set predetermined region. One area includes one or more pixel regions. Furthermore, the characteristic-amount generation part 54*b* cuts out the specified predetermined region for each of the components R, G, and B and acquires the average value of the luminance of each pixel included in the cut-out region. Reference numeral 1202 denotes a method for acquiring the gradient intensity and the gradient angle for each region of the characteristic amount relating to luminance from the image data. Similarly to 1201, the characteristic-amount generation part 54*b* divides the camera image into one or a plurality of areas and specifies the area to be the target in accordance with the set predetermined region. Furthermore, the characteristic-amount generation part 54*b* cuts out the specified predetermined region for each component of R, G, and B and acquires the intensity and angle of the lateral and lateral differential values (gradient) for each region.

Reference numeral 1203 denotes a method for acquiring an amount of change (degree of change) obtained by further differentiating the characteristic amount as shown in 1201 and 1202 in the time direction. Reference numeral 1231 denotes time-series data of the characteristic amount extracted from the camera image. Reference numeral 1232 denotes a graph obtained by differentiating the time-series data shown in 1231 and squaring the differential value. Thus, as shown in 1232, the amount of change can be confirmed more remarkably.

Reference numerals 1201 and 1202 denote characteristic amounts in a predetermined region in one image, and reference numeral 1203 denotes a characteristic amount in the time direction thereof. Note that the present subject matter is not limited to these extraction methods, and various other extraction methods can be applied. An arbitrary extraction method is preferably applied in accordance with the characteristics of the monitoring target. For example, when there is a need to measure the dimensions of an object photographed as a characteristic amount, it is necessary to calculate a more advanced characteristic amount. In this case, it is preferable to perform edge processing on an image in a predetermined region designated by the user or at a designated timing to measure the dimensions. Although the example using one camera sensor 10 has been described in the present embodiment, a plurality of camera sensors may be used to measure the distances and dimensions in a three-dimensional space. Furthermore, character recognition may be performed by an optical character reader (OCR) on a designated region of a taken camera image, the extracted character string (numerical value) may be used as a characteristic amount, and for example, in the case of a taken image of a thermometer, a barometer, or other various measurement instruments, a character recognized numerical value is used as a characteristic amount. Note that a recognized character string except for a numerical value may be used as a characteristic amount. As another characteristic amount, a neural network may be used to extract the characteristic amount. For example, in the neural network, image parameters relating to the position, operation, and postures of a person, a workpiece, or the like to be photographed may be learned as teacher data, and by using the learned model, the coordinates, the joint angles or the like of the posture of the person, the workpiece, or the like may be extracted as a characteristic amount.

<Camera Image Acquisition and Characteristic-Amount Generation Processing Procedure>

Figure 13:
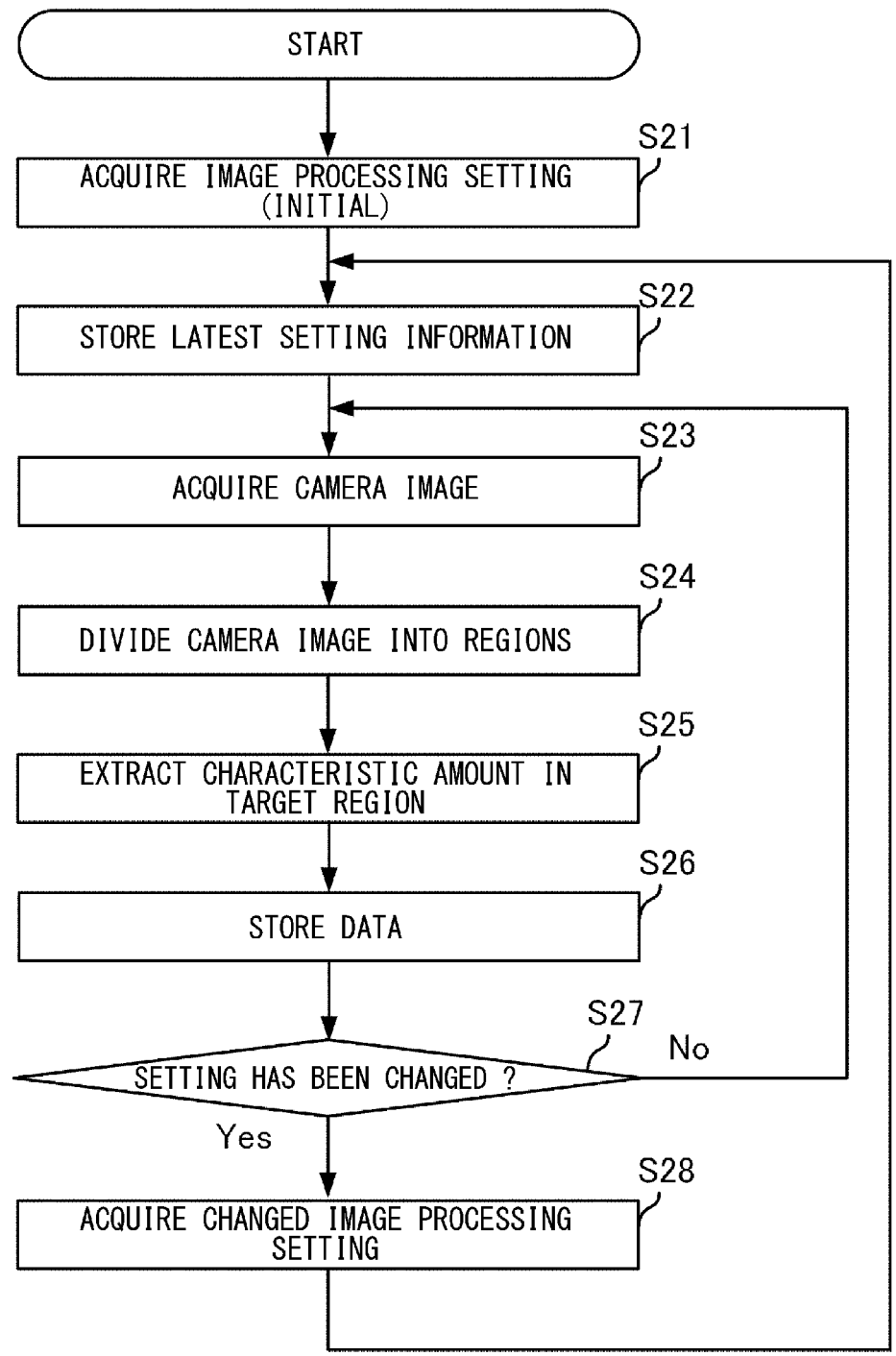
FIG. 13 is a flowchart showing a processing procedure of camera image acquisition and characteristic-amount generation.

FIG. 13 is a flowchart showing a detailed processing procedure of the acquisition of the camera image and the generation of the characteristic amount in S2 above according to the present embodiment. The processing described below is executed by the CPU 41*a* of the camera input unit 4*a*.

First, in S21, the CPU 41*a* acquires setting information set from the basic unit 3 or the analysis unit 4*b*. The setting information includes various parameters used at the time of generating the characteristic amount as the image processing settings. The parameters include, for example, parameters (area number, coordinates, etc.) relating to the set predetermined region and parameters indicating the type of the characteristic amount to be extracted. In S22, the CPU 41*a* stores the latest acquired setting information into the memory 42*a*.

Next, in S23, the CPU 41*a* (characteristic-amount generation part 54*b*) acquires image data of the camera image, taken by the camera sensor 10 and stored in the fourth buffer 37*d* of the memory 42*a* via the camera input unit 45. Next, in S24, the CPU 41*a* (characteristic-amount generation part 54*b*) divides the acquired camera image into areas of a predetermined size and cuts out a predetermined region as a monitoring target in the camera image in accordance with to the setting information stored in S22. The cutout region may have a rectangular shape or may have a shape except for a rectangular shape. When the cutout region has a shape except for a rectangular shape, the specification is possible by providing the operator with a setting screen in which the divided areas can be specified individually. In addition, a mask region to be excluded from the object for generating a characteristic amount may be provided in the cutout region. By providing such a designation method, it is possible to designate the removal of a pixel or an area that makes no change in the time direction, and it is possible to monitor the change in the characteristic amount in the target region with higher accuracy.

In S25, the CPU 41*a* (characteristic-amount generation part 54*b*) extracts a predetermined characteristic amount from the cutout predetermined region in accordance with the setting information stored in S22 and generates characteristic amount data from the image data. When generating the characteristic amount data, the CPU 41*a* (characteristic-amount generation part 54*b*) stores the generated characteristic amount data into the fourth buffer 37*d* of the memory 42*a* in S26. The generation of the characteristic amount of the image data is performed on the camera images sequentially captured by the camera sensor 10. The stored characteristic amount data is collected by the basic unit 3 in S3 above and accumulated sequentially. The sequentially accumulated data is transferred to the analysis unit 4*b* in S4 as time-series data. Each characteristic amount data in the time-series data is stored in association with a counter common in the PLC 1, for example, a timer value, time information, and the like, and is synchronized with the device value of other devices in accordance with the counter. This can be achieved by providing the camera input unit 4*a* in the PLC layer. For example, when a network camera as an external apparatus is used instead of the provision in the PLC layer, the accuracy of synchronization is lowered due to an error when the synchronization is performed using the time information in each device, further a delay occurs due to the data transmission/reception of the camera image via the network, and the synchronization cannot be performed with high accuracy. On the other hand, by providing the camera input unit in the PLC layer, each unit in the PLC layer can operate according to the operation clock of the basic unit, and synchronization with high accuracy can be easily achieved.

In S27, the CPU 41*a* (the characteristic-amount generation part 54*b*) determines whether or not a setting change has been made via a setting screen (setting screen 1700) to be described later. When there is no setting change, the processing returns to S23 in order to acquire the next camera image. On the other hand, when a setting change is made, the CPU 41*a* (characteristic-amount generation part 54*b*) proceeds to S28, acquires the changed image processing setting, for example, change information of the region in which a characteristic amount is generated, returns the processing to S22, and stores the acquired latest setting information into the memory 42*a*. Thus, the subsequent characteristic-amount generation can be performed with the latest setting information. As described with reference to FIG. 12, a method corresponding to the type of the characteristic amount to be generated can be used for generating the characteristic amount data. An additional description will be given concerning the characteristic-amount generation. The characteristic-amount generation part 54*b* may derive a motion amount from the generated characteristic amount and binarize the motion amount. For example, values indicating whether or not there is a change for each pixel may be indicated by 0 and 1, and the values in the monitoring region may be averaged. In this case, it is possible to perform the abnormality detection as a bit signal and to easily detect a state different from usual. Further, the characteristic-amount generation part 54b may generate the characteristic amount by averaging the values in a predetermined region in the camera image. Therefore, the time-series data of the characteristic amount in the camera image is not necessarily classified into analog values in the classification of collected data described later.

<Classification of Collected Data>

Figure 23:
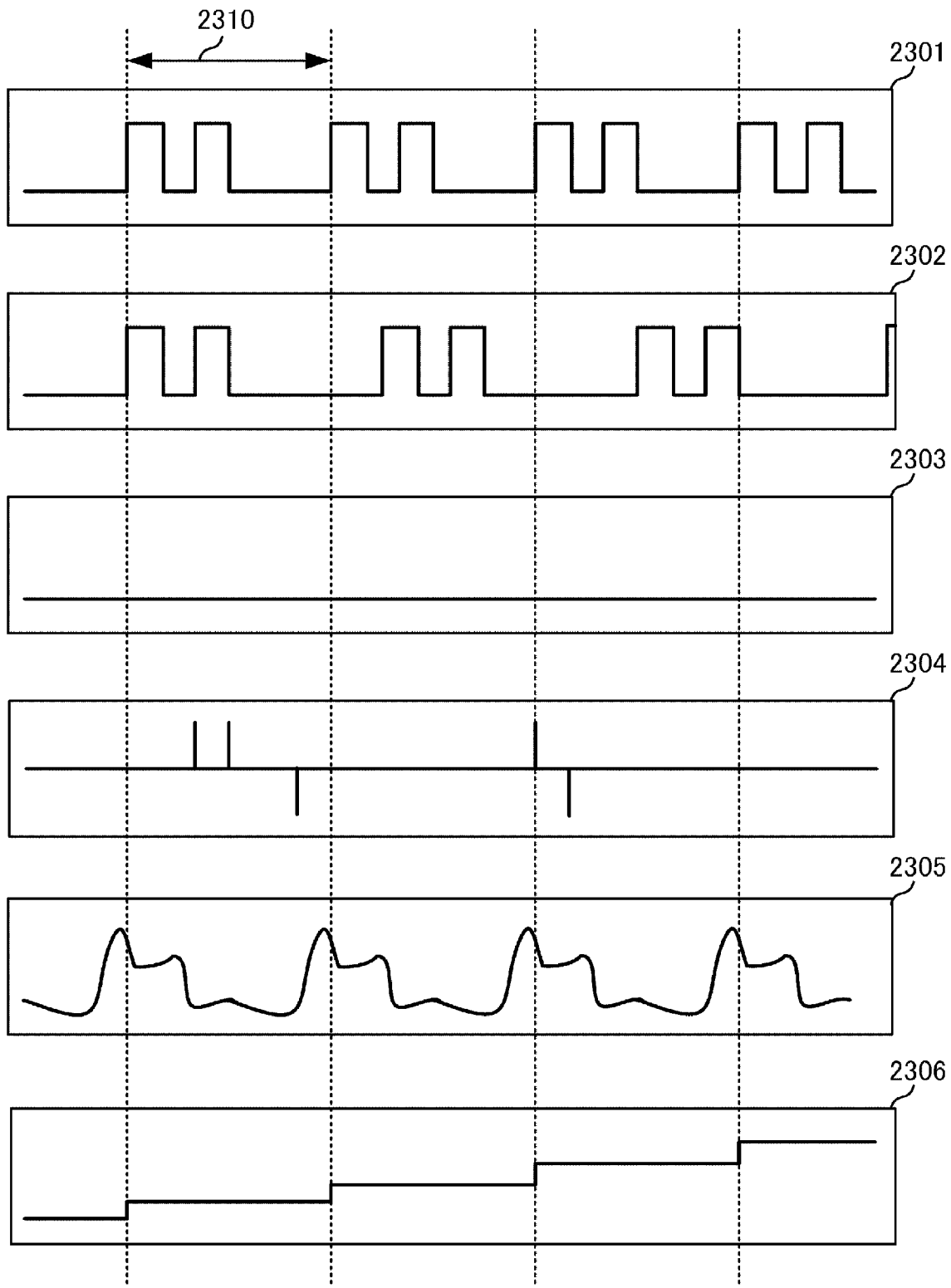
FIG. 23 is a diagram showing classification of collected data.

FIG. 23 shows an example of the type of time-series data to be collected. Reference numerals 2301 to 2306 each denote time-series data of a device signal of each type. Note that the types described below are only examples and not intended to limit the present subject matter, and the present subject matter may be applied to other types. In the present subject matter, the types for classification preferably include at least two types of these plurality of types in order to improve the classification effect.

Reference numeral 2301 denotes a device signal of a device that operates in synchronization with the operation cycle of the apparatus. Reference numeral 2310 denotes the operation cycle of the apparatus. The 2301 type indicates a type in which a similar change pattern (steady change pattern) occurs for each operation cycle of the apparatus. In this type, for example, such a monitoring method is allocated in which a steady change pattern is identified from time-series data acquired during a period that can be regarded as a normal state, and an abnormal device which is different from usual is identified on the basis of a deviation identified from the steady change pattern from the newly acquired time-series data. Specifically, variation in time relating to the change point is measured for the change pattern of the time-series data of each of a plurality of cycles, which can be regarded as a normal state, and a threshold is set according to the measured variation. A monitoring algorithm for detecting an abnormal device is allocated on the basis of whether or not the change point of the time-series data acquired thereafter exceeds the range of a threshold set corresponding to the change point. For example, a plurality of waveforms for each operation cycle of the apparatus are superimposed, and on the basis of the variation in point at which a device changes from OFF to ON, a reference value and a threshold of the change point are set, so that an abnormal device can be identified using these parameters. In each cycle of 2301, a relative time indicating the rising timing of a first signal or a phase in each cycle may be used as an evaluation variable, and a parameter corresponding to the evaluation variable may be determined on the basis of the variation of the evaluation variable. For example, when the phase in each cycle is used as an evaluation variable, an upper limit threshold and a lower limit threshold of the phase may be used as parameters.

On the other hand, reference numeral 2302 denotes a device signal of a device which is not synchronized with a scan cycle but operates in synchronization with a cycle except for the operation cycle of the apparatus. For this type as well, for example, such a detection method is allocated in which a steady change pattern is identified from time-series data acquired during a period that can be regarded as a normal state, and an abnormal device (a device different from usual) is identified on the basis of a deviation identified from the steady change pattern from the newly acquired time-series data. Specifically, variation in time relating to the change point is measured for the change pattern of the time-series data of each of a plurality of cycles, which can be regarded as a normal state, and a threshold is set according to the measured variation. A detection algorithm for detecting an abnormal device is allocated on the basis of whether or not the change point of the time-series data acquired thereafter exceeds the range of a threshold set corresponding to the change point. In each cycle of 2302, a relative time indicating the rising timing of a second signal or a phase in each cycle may be used as an evaluation variable, and a parameter corresponding to the evaluation variable may be determined on the basis of the variation of the evaluation variable. For example, when the relative time in each cycle is used as an evaluation variable, an upper limit threshold and a lower limit threshold of the relative time may be used as parameters, respectively.

Reference numeral 2303 denotes a device signal of a device taking a constant value. In this type, for example, such a detection method is allocated in which a value at the normal time is identified from time-series data acquired during a period that can be regarded as a normal state, and a newly acquired time-series data different from the identified value at the normal time is identified as an abnormal device which is different from usual. Specifically, a detection algorithm is allocated where a value of the device in the time-series data that can be regarded as a normal state is set as a detection reference value, and an abnormal device is detected on the basis of whether or not the value of the time-series data acquired thereafter is different from the detection reference value set corresponding to the value at the normal time. In other words, when a value (constant value) changes, the value can be determined as abnormal. Reference numeral 2304 denotes a device signal of a device that operates irregularly. This type is excluded from data used at the time of identifying an abnormal device. Reference numeral 2305 denotes a device signal of a device taking an analog value. The image data acquired from the camera sensor 10 is classified into this type. In the device taking an analog value, as described later, with the device value being not the device value of the bit device, the processing proceeds to No of S31 in FIG. 24A (S37 of FIG. 24B), and as shown in FIG. 24B, an algorithm in the abnormality detection is different depending on the method for changing data. As the algorithm in the abnormality detection of the device taking an analog value, various methods such as a dynamic time warping method and an autoregressive model can be used. Reference numeral 2306 denotes a monotonically increasing and monotonically decreasing device signal of a device. In this type, an abnormal device is identified using a differential value and an integrated value. Further, a relative time indicating the timing of a monotonous increase or a monotonous decrease or a phase in each cycle may be used as an evaluation variable. Note that the types described here are only examples, and devices classified into other types are also assumed, and some can take a plurality of states (stepped device signal etc.), for example. Those taking a plurality of states can be determined to be abnormal when changing to a state different from the state at the normal time.

Each device includes a 0, 1-bit type device, and a word type device or a floating-point number type device taking an analog value. Note that the word device further includes a 1-word unsigned integer (0 to 65535), a 1-word signed integer (−32768 to 32767), a 2-word unsigned integer (0 to 4294967295), and a 2-word signed integer (−214783648 to 214783647). In consideration of such a type, for example, when the rate of change per scan cycle is equal to or greater than a predetermined value and the type is not a bit, the device can be determined as the device taking an analog value.

<Classification Processing>

Figure 24A:
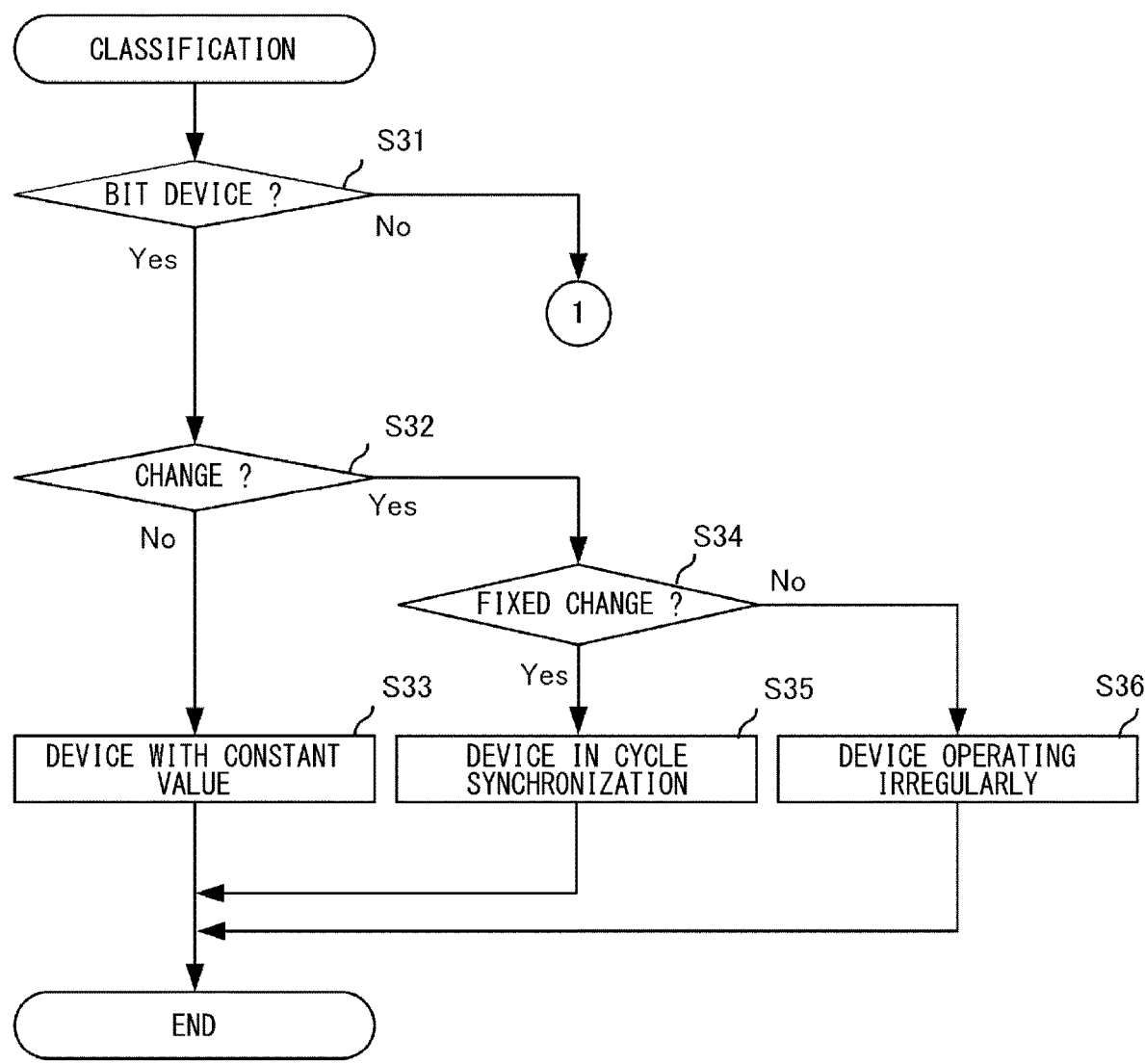
FIG. 24A is a flowchart showing a processing procedure of the classification.
Figure 24B:
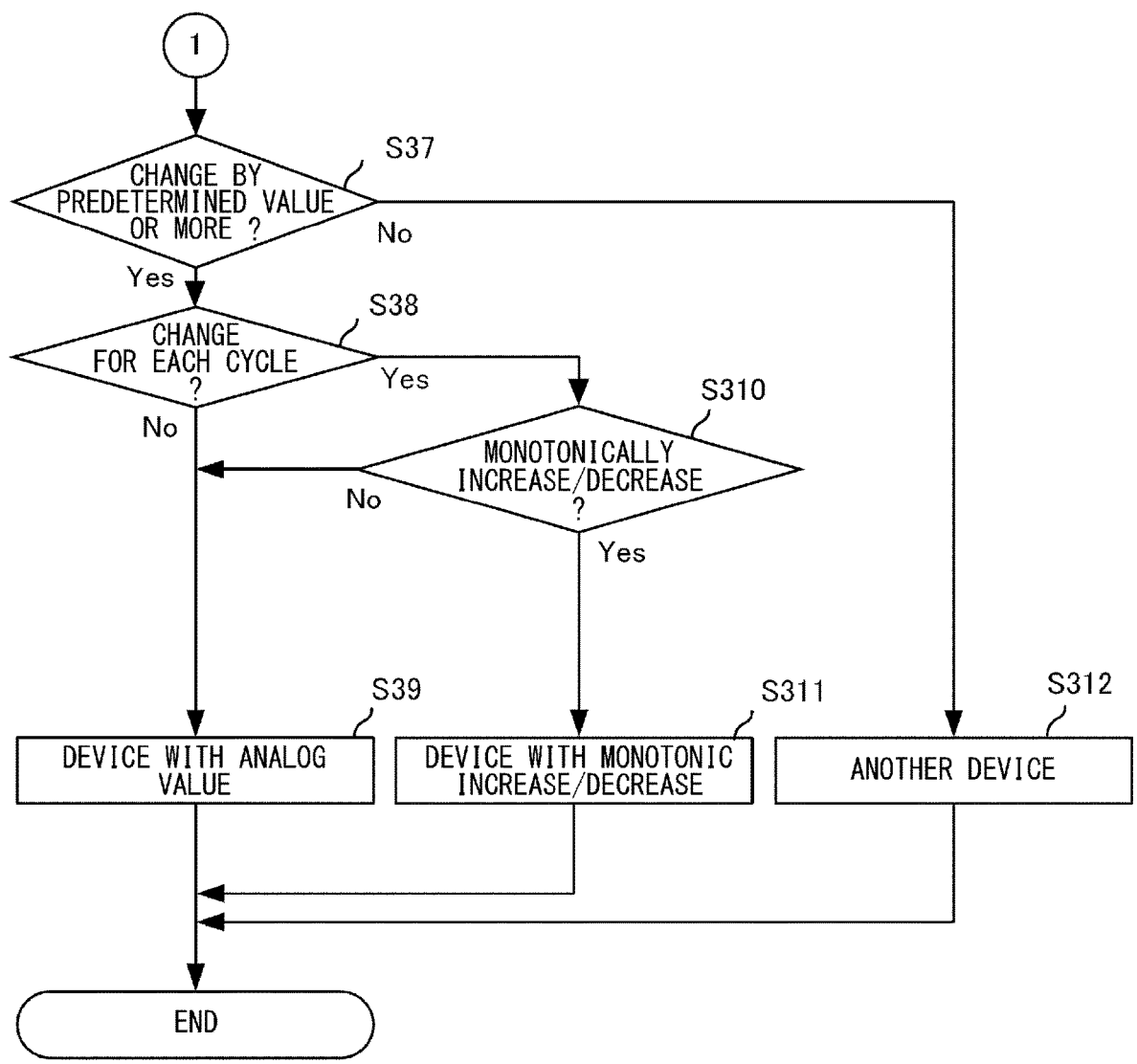
FIG. 24B is a flowchart showing a processing procedure of the classification.

FIGS. 24A and 24B are flowcharts showing a processing procedure at the time of classifying the data collected in S3 above. The processing described below is achieved by the CPU 31 of the basic unit 3. However, this is not intended to limit the present subject matter, and a part of the processing may be executed in the extension units 4a, 4b, 4c or may be executed by the external apparatus (analysis apparatus) communicatively connected to the programmable logic controller. Note that the processing described below is an example of learning processing which is automatically performed when a device value is collected, and the processing may be always learned when a device value is collected but may also be periodically performed or be performed for a certain period on the basis of an instruction from the user.

In S31, the CPU 31 determines whether or not the time-series data to be classified is the device value of the bit device. When the device value is the device value of the bit device, the processing proceeds to S32; otherwise, the processing proceeds to S37 of FIG. 24B.

In S32, the CPU 31 determines whether or not there is a change in the value of the time-series data to be classified. When there is a change, the processing proceeds to S34, and when there is no change and a constant value is taken, the processing proceeds to S33. In S33, the CPU 31 classifies the time-series data to be classified as the device (2303) taking a constant value and ends the processing. As the classification information, information associated with the time-series data is stored, for example, flag information indicating a classified type, is stored in association with the time-series data or discrimination information indicating a device corresponding to the time-series data. As thus described, the flag information of the type classified at the time of classification of the data collection and the discrimination information of the device are associated and stored in advance, whereby in the analysis processing, the evaluation variable or parameter as the detection algorithm of the abnormal device can be easily selected according to the type associated with the discrimination information of the device in accordance with which device the time-series data to be analyzed is the data from. That is, in the analysis processing, it is possible to omit the processing of specifying which type the time-series data to be verified corresponds to. Although the flag information indicating the classified type has been shown as an example as the classification information, algorithm information indicating an algorithm for identifying an abnormal device may be used instead of the flag information. When the device corresponding to the time-series data is a variable, needless to say, the discrimination information stored as the classification information is discrimination information indicating the variable.

In S34, when there is a change in the value of the time-series data, the CPU 31 determines whether the change is a steady change pattern in each cycle. When it is determined that the pattern is a steady change pattern, the processing proceeds to S35, and when it is determined that the pattern is not a steady change pattern, the processing proceeds to S36. Here, the steady change pattern indicates a pattern that changes in a similar pattern in each cycle. In S35, the CPU 31 classifies the device as a device, which operates in a predetermined cycle, and ends the processing. As described above, the device that operates in a predetermined cycle includes the device (2301) that operates in synchronization with an operation cycle of the apparatus and the device (2302) that operates in synchronization with a cycle except for the operation cycle of the apparatus, and the CPU 31 classifies the device as each of the devices. On the other hand, in S36, the CPU 31 classifies the device as the device (2304) that operates irregularly and ends the processing.

On the other hand, when it is determined in S31 that the device is not a bit device, the processing proceeds to S37 shown in FIG. 24B, and the CPU 31 determines whether or not the time-series data to be classified has changed by a predetermined value or more. Here, it is determined whether or not an extreme value of a changing signal is equal to or greater than a predetermined value. When there is a change, the processing proceeds to S38; otherwise, the processing proceeds to S312.

In S38, the CPU 31 determines whether or not the value is changing in a predetermined cycle, and when the value is not changing in a predetermined cycle, the process proceeds to S39, and when the value is changing, the process proceeds to S310. In S310, the CPU 31 determines whether or not the changing value is increasing monotonically or decreasing monotonically. When the changing value is monotonically increasing or monotonically decreasing, the processing proceeds to S311; otherwise, the processing proceeds to S39.

In S39, the CPU 31 classifies the device as the device (2305) with an analog value and ends the processing. There are various types of devices of analog values, and individual correspondence is performed according to the type of the device to be classified. On the other hand, in S311, the CPU 31 classifies the device as the device (2306) with a monotonic increase or a monotonic decrease and ends the processing. In S312, the CPU 31 classifies the device as another device and ends the processing. When it is determined that the device is another device, the characteristic of the time-series data to be classified cannot be extracted, and the characteristic operation at the normal time cannot be identified, so that the device is not used at the time of identifying an abnormal device.

The CPU 31 preferably determines a parameter for identifying the abnormal device in accordance with the classified time-series data. The determination processing here is performed for each classified type, and the type of the device corresponding to the time-series data and the parameter are stored in association with each other. When there is an already determined parameter, the parameter may be updated to the parameter determined this time instead of the already determined parameter, or a new parameter may be calculated and updated using the already determined parameter and the parameter determined this time. Various methods, such as an average value, can be applied to the calculation method, and a method suitable for each time-series data is selected. The determined parameters may be made changeable by the operator. Thus, even when an extreme parameter is determined in the case of the learning period being short, it is possible to make an adjustment.

Here, the parameters to be determined will be described. For the 2301 and 2302 types in FIG. 23 (the devices in each of which the value changes in a steady pattern in synchronization with a predetermined cycle), for example, the CPU 41b calculates the time between arbitrary change points of the waveform for each operation cycle of the apparatus from the change pattern of the waveform within the operation cycle of the apparatus and determines the threshold of the time between the change points as a parameter on the basis of the distribution of the time between the change points. Further, the parameter in this case may include the timing at which the device value of the time-series data at the normal time changes. The threshold of the time between the change points as the parameter described above may be determined, for example, by calculating a standard deviation and an average value from the variation at the time of learning, setting the average value +3× standard deviation as the upper limit threshold, and setting the average value −3× standard deviation as the lower limit threshold. For the 1203 type (the device taking a constant value), the CPU 41a uses the constant value as a parameter. As described above, for the device with its value changing in a steady pattern in synchronization with a predetermined cycle, a time interval between change points, the timing of change points, and a threshold related thereto are used as parameters.

For the 1205 type (analog value), for example, the value of the time-series data at the time of learning and a threshold relating to the distance from the time-series data at the time of learning may be used as parameters. The calculation method for the distance may be, for example, a method for obtaining the sum of the differences for the respective points. In this case, at the time of estimation, the distance between the time-series data during the learning and the time-series data at the time of estimation is calculated, and it is determined whether the distance is within the range of the threshold. As for the 1206 type (monotonic increase, monotonic decrease), for example, an increased value at the time of monotonic increase and a decreased value at the time of monotonic decrease at the normal time are determined as parameters.

As described above, according to the present embodiment, each device is classified as one of a plurality of previously determined types on the basis of the periodicity characteristic of the time-series data of each device, and a detection algorithm of an abnormality (a change different from usual), which is appropriate for each classified type, is applied. That is, in the present embodiment, in the learning phase, the device is classified as one of a plurality of previously determined types from the time-series data at the normal time. Furthermore, a detection algorithm is determined according to each type, and an evaluation variable and a parameter corresponding to each detection algorithm are set. On the other hand, in the estimation phase, for each device with its detection algorithm determined in the learning phase, the detection algorithm determined according to the type of the determined estimation target device is applied to the time-series data of the device. Thus, the abnormal device is identified by analyzing the time-series data of the device by using the detection algorithm of the abnormal device corresponding to the type of the device determined in the learning phase or the type of the device. Note that a device that was not classified into a predetermined type at the time of learning is preferably not taken a device as a collection target at the time of estimation because no evaluation variable or parameter has been set. In other words, the above is for preventing the following: even when such data is collected, since a detection algorithm for identifying whether or not the device is an abnormal device has not been set, the processing load and the consumption of memory resources increase unnecessarily.

<Monitoring Processing (Preprocessing/Analysis Processing)>

Figure 14:
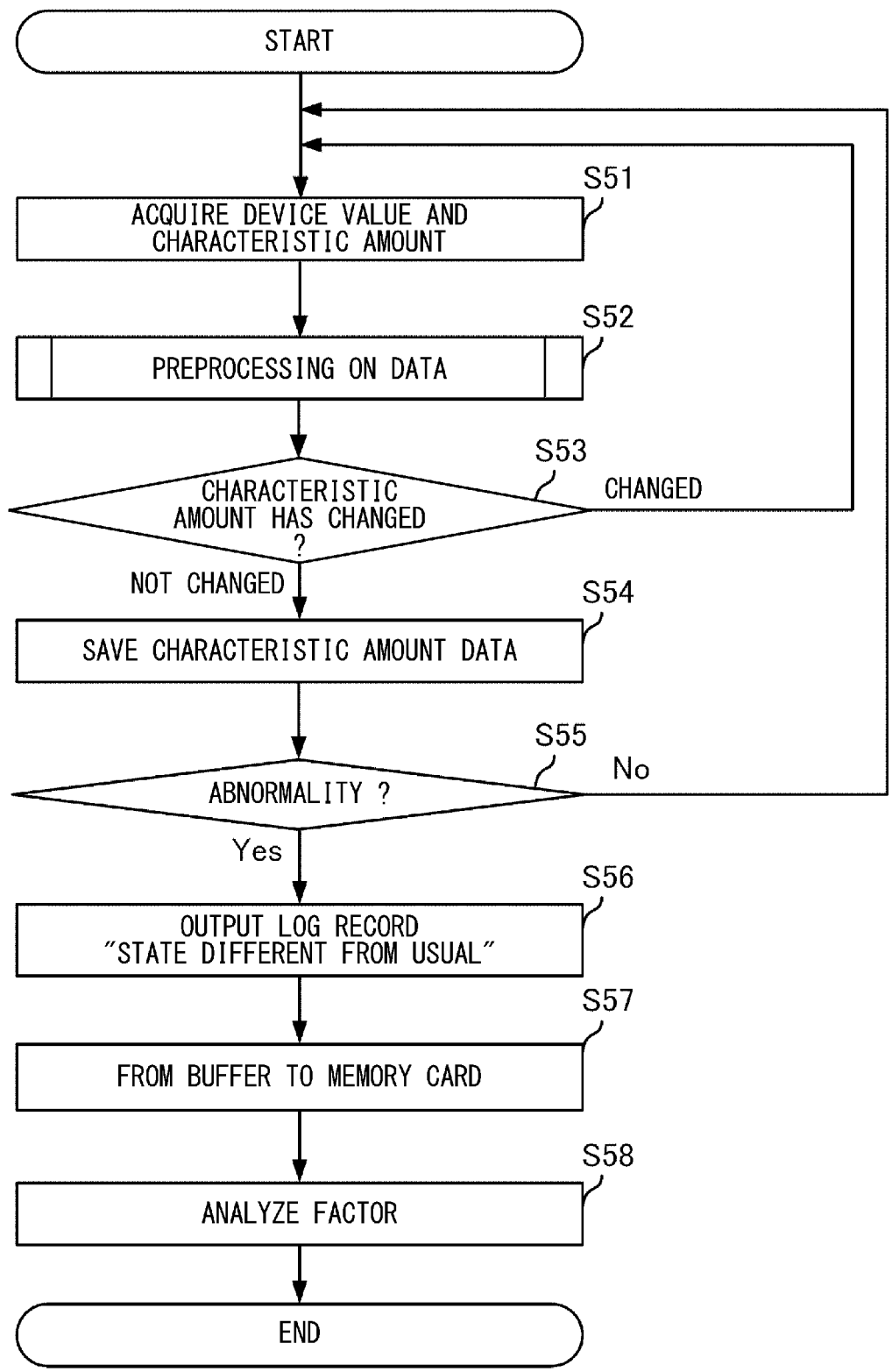
FIG. 14 is a flowchart showing a processing procedure of monitoring processing.

FIG. 14 is a flowchart showing a detailed processing procedure of the monitoring processing (preprocessing/analysis processing) in S5 above according to the present embodiment. The processing described below is executed by the CPU 41b of the analysis unit 4b. Here, as an example of the preprocessing, description will be given of the processing for cutting out the time-series data of a predetermined section to be a monitoring target by synchronizing the time-series data of the device value with the time-series data of the characteristic amount data, but this is not intended to limit the present subject matter, and for example, the data may be monitored as it is without being cut out, or may be subjected to the movement statistics in the time axis direction, for example, the data may be filtered with a filter of an average value or a maximum value for every 10 second section.

First, in S51, the CPU 41b acquires the time-series data of the device value of each device transferred from the basic unit 3 in S4 and the characteristic amount data of the camera image taken by the camera sensor 10. Further, the CPU 41b analyzes the time-series data of the acquired device value and the characteristic amount, classifies the data on the basis of the characteristics of each device, and determines a detection algorithm. Specifically, when data is acquired, the CPU 41b first executes classification processing. The classification processing is similar to the classification processing in the learning phase described with reference to FIGS. 24A and 24B. Further, the CPU 41b classifies the type of each data to be monitored and then acquires various parameters such as thresholds for performing analysis, held in association with the type. The parameters are used in the abnormality determination in S55 to be described later.

In S52, the CPU 41b (data processing part 73) executes preprocessing for each time-series data acquired in S51. In the preprocessing, the association is performed so that the data can be handled as synchronized data, and a section of a monitoring target is cut out in each of the time-series data of the device value of the synchronized predetermined device and the time-series data of the characteristic amount data. That is, instead of monitoring all the data of the time-series data, for example, the cutout is performed so that the time-series data in a predetermined section having a change in the device value is monitored, and the improved monitoring is achieved while reducing the processing load. Details of the preprocessing will be described with reference to FIGS. 15 and 16. Note that all periods of the acquired time-series data may be monitored without the cutout of the time-series data.

In S53, the CPU 41b (monitoring part 76) determines whether or not there has been a predetermined change in the time-series data of the characteristic amount subjected to the preprocessing in S52. Here, the predetermined change means a change exceeding the threshold range set for each characteristic amount included in the setting information set from the basic unit 3 or the analysis unit 4b. The threshold range is determined on the basis of the separation from the data of the normal section set by the user. For example, the standard deviation and the average value may be calculated, and the upper limit may be set to the average +3× standard deviation, and the lower limit may be set to the average −3× standard deviation. Alternatively, the threshold range may be determined in accordance with the number of times the predetermined threshold has been exceeded. When there is no predetermined change, the processing returns to S51, and the processing proceeds to the next data processing. On the other hand, when it is determined that there is a predetermined change, the processing proceeds to S54, and the CPU 41b (monitoring part 76) saves the time-series data of the characteristic amount, subjected to the preprocessing in S52, into the memory 42b. Here, the time-series data is saved in association with a predetermined device value.

Next, in S55, the CPU 41b (monitoring part 76) analyzes the time-series data of the device value and the characteristic amount on the basis of the detection algorithm such as the type and the parameter acquired in S51 above and determines whether or not a change different from usual has been detected. When an abnormality is detected, various abnormalities can be determined in, for example, such cases as follows: a case where the degree of change in S53 is equal to or greater than a predetermined value; and a case where the number of changes detected in a predetermined section is equal to or greater than a predetermined value, and a case where the relationship with changes in other device values is different from usual. Further, the relationship between the different characteristic amounts, for example, the difference between the characteristic amount A and the characteristic amount B, the correlation values of a plurality of characteristic amounts, the Mahalanobis distance, and the like may be analyzed. Alternatively, the number of times the device value of another device changes while the characteristic amount of the camera is within a certain range may be determined. When there is no abnormality, the processing returns to S51, and the processing proceeds to the next data processing. On the other hand, when there is an abnormality, the process proceeds to S56, and the CPU 41*b* (monitoring part 76) outputs, as a log record, that there is a change different from usual. Note that the log record may be saved when a previously determined saving condition is satisfied by the user program. For the recording location, the storage may be performed in the storage apparatus 32 of the basic unit 3 or in the memory 42*b* of the analysis unit 4*b*. As the information stored as the log record, for example, the corresponding image data may be saved in addition to the time-series data of the characteristic amount. The synchronized time-series data of the device value may be saved. Further, the user may be notified of the saving via the PCs 2*a*, 2*b*. Alternatively, the external apparatus may be notified by e-mail or the like. Subsequently, in S57, the CPU 41*b* (monitoring part 76) saves the log from the first buffer 37*a* of the basic unit 3 and the buffers 37*b*, 37*c* of the analysis unit 4*b* into the memory card 44 of the basic unit 3 and the memory card (not shown) of the analysis unit 4*b*.

In S58, the CPU 41*b* (monitoring part 76) analyzes the abnormality by using the data recorded in S57, specifies whether a predetermined abnormality or a device abnormality has occurred and the factor of the abnormality, and ends the processing. Even when a change different from usual is detected, it is not always necessary to specify that an emergency abnormality has occurred in S58. The degree of abnormality may be specified. The analysis result is reflected on the result display in S6 above. For the specification of the abnormal factor, a learned model learned from various teacher data at the time of abnormality may be used, or a preset abnormal factor set in advance in accordance with a characteristic amount having a change different from usual may be specified. For an abnormality in the device value, the type of the signal may be classified in accordance with the cyclic property and continuity of the time-series data, and a determination criterion may be provided in accordance with each classified type to specify whether or not the device abnormality has occurred or the factor thereof. Types to be classified include, for example, signals of a device that operates synchronously with a scan cycle, a device that operate asynchronously, a device that take a constant value, a device that operates irregularly, a device that monotonically increases and monotonically decreases, and a device that take an analog value. The classification of these may also be performed using a learned model learned from the normal time-series data as teacher data. These learning models may be learned using data determined to be normal or data determined to be abnormal during the monitoring by the PLC 1.

<Cutout of Data>

Figure 15:
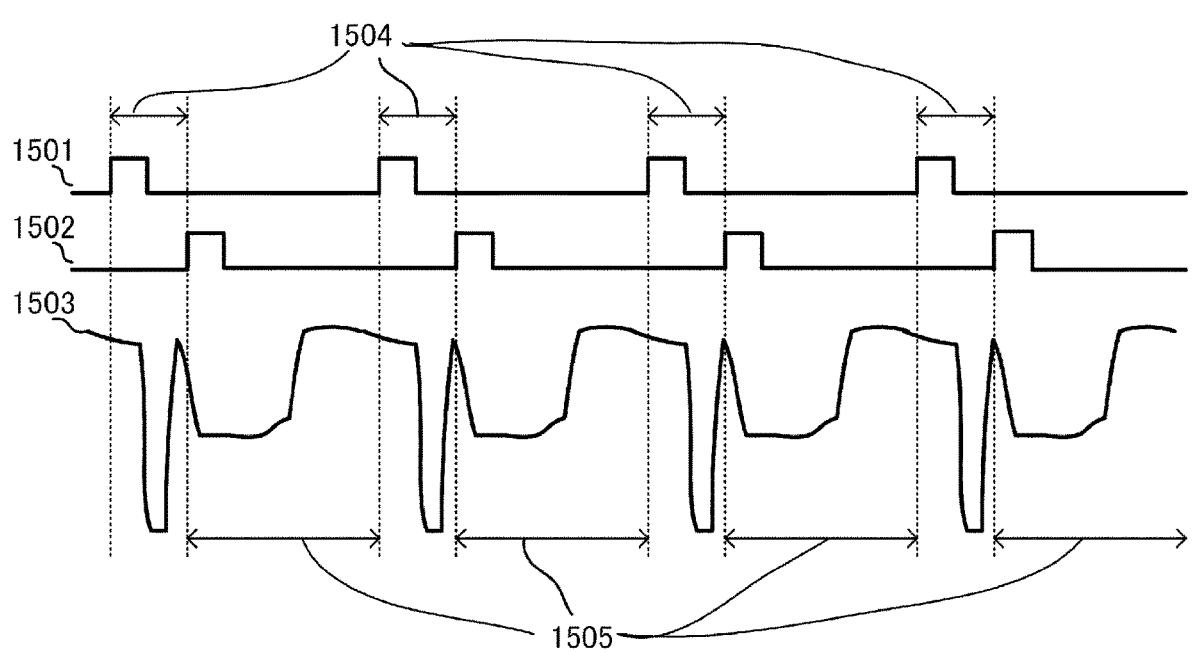
FIG. 15 is a diagram for explaining data cutout.

In the present embodiment, the designation of the reference device is received, and the data of a predetermined section is cut out from the time-series data of the characteristic amount data. For example, when a device A is designated as a reference device, the data of the corresponding section is cut out from the time-series data of the characteristic amount data with a cycle from the timing at which the device value of the device A turns from OFF to ON to the timing at which the device value next turns from OFF to ON. In the following, a method for cutting out data by using two reference devices will be described. FIG. 15 is a diagram for explaining data cutout. Here, a description will be given of a method (cycle cutout) for cutting out data in a predetermined section from time-series data of characteristic amount data of a camera image in association with a predetermined reference device (Device A and device B).

Reference numeral 1501 denotes the time-series data of the device A, reference numeral 1502 denotes the time-series data of the device B, reference numeral 1503 denotes the characteristic amount data of the camera image, and each time-series data is in a synchronized state. As shown at 1501, the device values of device A and device B have the cyclic property. Here, the characteristic amount data of the camera image is cut out to be a monitoring target 1504 and the other sections are set to be a non-monitoring target 1505 by using a portion from the change of OFF to ON of the device A to the change from OFF to ON of the device B as a separator. This makes it possible to exclude (mask) sections that are unpreferable as a monitoring target. For example, it is possible to prevent the accuracy in abnormality detection from being lowered due to a pause in operation or a hand of a person appearing in a camera image, thereby reducing erroneous detection. Note that there are various cutout methods, and for example, a section from a change of OFF to ON of a predetermined device to a change from ON to OFF may be used as a cutout section. Although the waveform of the predetermined section is cut out here, the value of the characteristic amount data of the camera image at the timing at which the device value of the reference device changes may be acquired.

<Processing Flow of Preprocessing>

Figure 16:
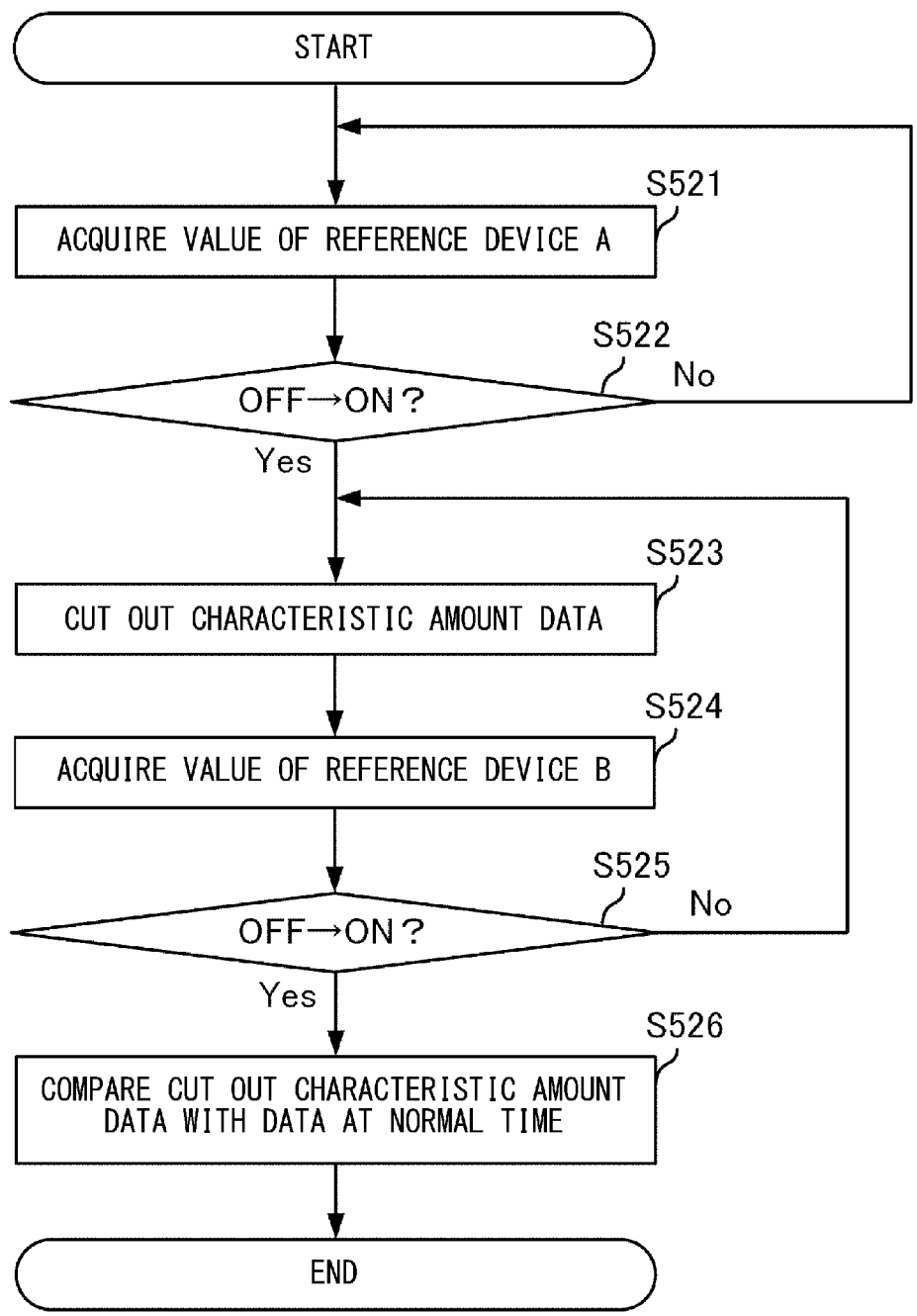
FIG. 16 is a flowchart showing a processing procedure of preprocessing.

FIG. 16 is a flowchart showing a detailed processing procedure of the preprocessing in S52 above according to the present embodiment. The processing described below is executed by the CPU 41*b* of the analysis unit 4*b*. Here, the preprocessing in the case of using the cutout method described with reference to FIG. 15 will be described.

In S521, the CPU 41*b* (data processing part 73) sequentially acquires the device value of the device A as a first reference device. In S522, the CPU 41*b* (data processing part 73) determines whether or not the device value acquired in S521 has changed from OFF to ON. When the device value has changed, the processing proceeds to S523, and when the device value has not changed, the processing returns to S521 to acquire the next device value.

In S523, the CPU 41*b* (data processing part 73) acquires and accumulates the device value of the device A acquired in S521 and the characteristic amount of the characteristic amount data at the same time. Next, In S524, the CPU 41*b* (data processing part 73) acquires the device value of the device B. In S525, the CPU 41*b* (data processing part 73) determines whether or not the device value acquired in S524 has changed from OFF to ON. When the device value has changed, the processing proceeds to S526, and when the device value has not changed, the processing returns to S523 to acquire the next device value.

In S526, the CPU 41b (data processing part 73) compares the waveform of the characteristic amount of the camera image accumulated in S523 with that at the normal time. Here, the comparison result is temporarily held, and the held information is used for the determination in S53 above. In this manner, by performing the cycle cutout of the characteristic amount waveform of the camera image in a predetermined section and comparing the cutout waveform with the waveform at the normal time, a change can be detected with high accuracy. As the comparison method, for example, there are a method of obtaining the Euclidean distance for each point and calculating the sum, a method of calculating the distance between two waveforms by dynamic time warping (DTW), and the like. When a change is detected, an abnormality is detected as described in S55 above.

<Monitor Item Setting Screen>

Figure 17:
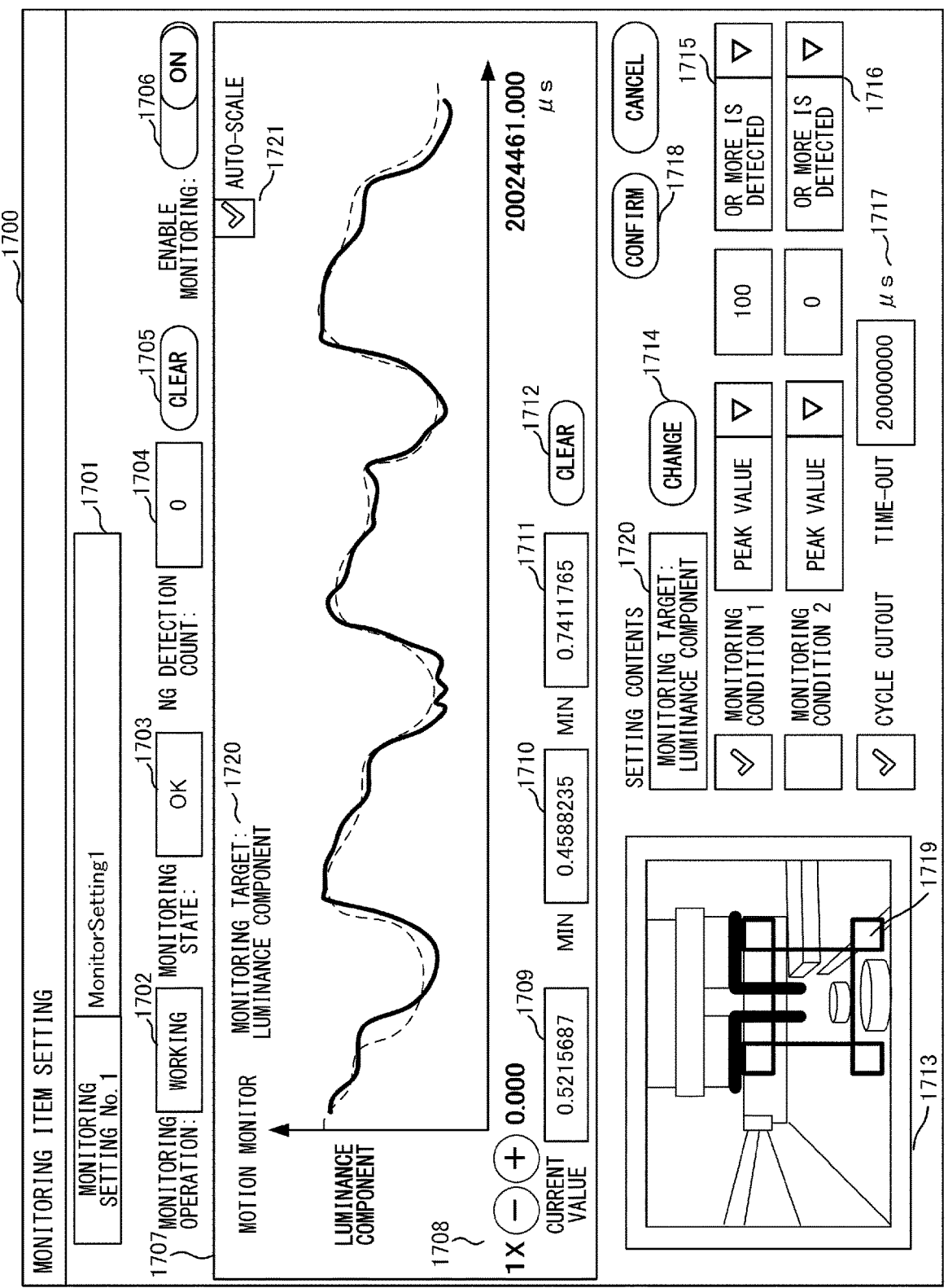
FIG. 17 is a view showing a monitoring item setting screen.

FIG. 17 is a diagram showing an example of a monitor item setting screen according to the present embodiment. A setting screen 1700 is displayed on the display part 7b of the PC 2b at a timing S1 above, or the like. Note that the screen 1700 may be displayed on the PC 2a or other external apparatuses. The display timing is not limited to the timing of S1 above but is set at an arbitrary timing. For example, the display of a confirmation screen 1800 in S6 above can be shifted to the setting screen 1700. In the case of displaying on the PC 2a, when the setting of the monitoring item is instructed on the setting screen of the project data, the setting screen 1700 may be shifted or displayed as a pop-up. Furthermore, the setting screen is a setting relating to abnormality detection, and there are case where important parameters affecting the safety guaranteed by the PLC system are set and where an operator in the field unintentionally changes parameters from the setting screen, so that it is preferable to perform authentication processing using operation authority or the like at the time of displaying the setting screen.

The setting screen 1700 includes various displays 1701 to 1718. A display 1701 indicates which monitoring setting is in use when there are a plurality of monitoring settings. When there are a plurality of monitoring regions, the setting can be performed by designating each of the monitoring regions. The display 1706 is a button for enabling or disabling the state of the monitoring operation. In addition to the setting on the setting screen 1700, it may be possible to select whether or not to enable monitoring in accordance with the output states of a human machine interface (HMI), a physical button, or a sensor. In this case, it may be determined whether or not the analysis unit 4b performs monitoring by a change being made in the value of the specific region of the device memory. The display 1702 indicates the state of the monitoring operation. "Working" is displayed when the monitoring is enabled, and "Stopped" is displayed when the monitoring is disabled. The display 1703 indicates the monitoring state. In response to the determination result of the monitoring, when the abnormality condition (monitoring condition) is not satisfied after the star t of the monitoring, "OK" is displayed, and when the condition is satisfied even once, "NG" is displayed until the abnormality detection is cleared. The abnormality detection indicates that a change different from usual described above has been detected. The display 1704 indicates the number of times an abnormality has been detected, that is, an NG detection count is detected. This indicates the cumulative number of times an abnormality has been detected since the monitoring state became "NG". In default, the total number of times of the monitoring condition 1 and the monitoring condition 2, which will be described later, is displayed, but this is not intended to limit the present subject matter but may be changed by specifications or the like. The display 1705 is a button for clearing the NG detection count. Upon the clearing, the monitoring state of the display 1703 becomes "OK", and the NG detection count is reset.

The display 1721 shows a check box for automatically adjusting and displaying the time-series data of the characteristic amount of the monitoring target in the display 1707. As the scale adjustment method, the following can be applied: a case where the upper and lower limits of the display range are set on the basis of the maximum value and minimum value of data acquired in the past; a method for setting the upper and lower limits of the display range on the basis of the maximum value and minimum value of the range currently displayed on the screen; and the like. When auto-scale is OFF, the upper and lower limits to be displayed may be selected in accordance with the user's input. The display 1720 displays the component to be monitored which is being selected on the setting screen 1700. The display 1707 shows a monitor screen in real time of a characteristic amount to be monitored. In the example of FIG. 17, the monitoring target is a luminance component, and a line graph of time-series data based on all image information acquired for each frame of the scan cycle of the luminance component is displayed on the monitor screen. The dotted line indicated by a dotted line is the value of the previous cycle or the average value so far. The solid line indicates the value of the current cycle. By displaying the difference so as to be comparable with the value of the past cycle, the difference can be easily recognized by the operator. The display 1708 indicates a button for instructing the enlargement/reduction of the characteristic amount. "1×" is a magnification display. The magnification is decreased with a "−" button, and the magnification is increased with a "+" button. When the display is enlarged, a scroll bar for moving and displaying the display region is displayed on the graph. Instead of the scroll bar, an operation button for moving the display region in the right-left direction may be displayed. In addition to these buttons, "Stop button", "Resume button" and "Button to save the current screen display" may be provided. Thus, the user can confirm the measurement state, for example, the motion monitor waveform, the camera image, and the characteristic amount from the characteristic amount graph at the desired timing. The display 1709 to 1711 shows "Current value" indicating the current characteristic amount, and the minimum value "MIN" and the maximum value "MAX" of the data acquired after the monitoring is enabled. The user can easily set the monitoring conditions by confirming these displays. The display 1712 shows buttons to clear the maximum value and the minimum value. When the buttons are operated, the maximum value and the minimum value are updated by newly acquired data.

The display 1713 displays a real-time image being taken by the camera sensor 10. Data thinned in consideration of the processing load may be displayed on the video, or data may not be thinned depending on the processing performance of the PLC 1. In the camera input unit 4a, the image data itself is acquired for each frame and saved in a buffer, but it is difficult to precisely match the time because the image data itself is monitored by communication via the Web server. Therefore, there is no particular problem in displaying the image data after thinning. The image shown in FIG. 17 captures how the skew of the workpiece being conveyed is corrected at a predetermined position when the workpiece is being conveyed in the factory. The display 1713 displayed inside the display 1719 is a frame for defining a predetermined region in which a characteristic amount is generated in the camera image taken by the camera sensor 10. For example, the predetermined region can be resized by dragging and operating a square point with a pointing device or the like. Here, a state is shown where the position for correcting the skew of the workpiece is set as a predetermined region. At the position, the workpiece being conveyed is carried by a member from the upper part, and the skew of the workpiece is corrected by a pushing member from the right-hand direction of the image. The region defined by the display 1719 is notified to the camera input unit 4*a* and is applied to the generation of the characteristic amount data of the camera image acquired thereafter. In the example of FIG. 17, a predetermined region which can be defined by the display 1719 is a rectangular shape but is not necessarily a rectangular shape. For example, it may be possible to individually designate divided areas. Further, it may be possible to designate a mask region within the defined predetermined region. The mask region indicates a region to be excluded from the monitoring region in which a characteristic amount is generated and monitored.

Figure 19:
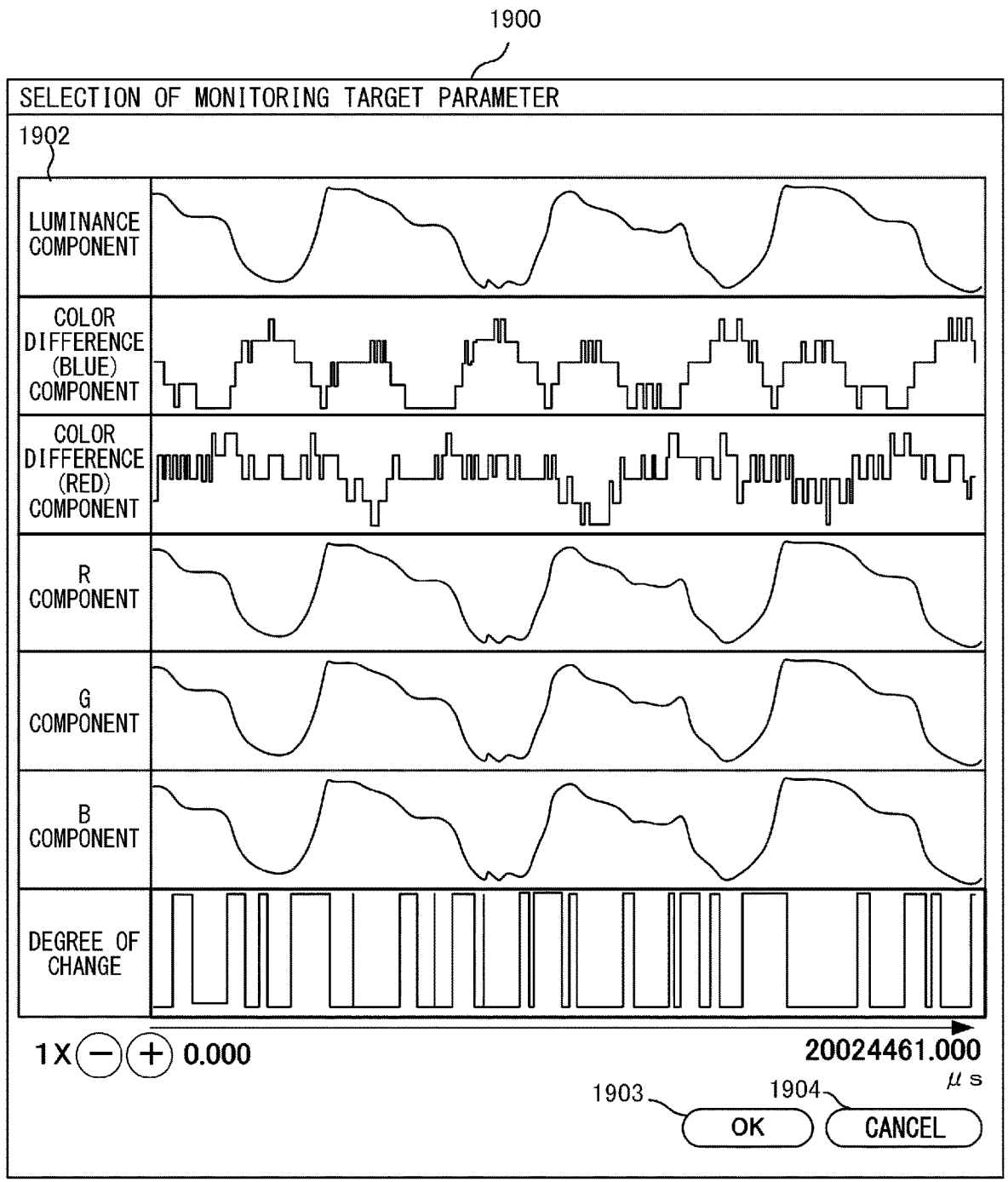
FIG. 19 is a view for explaining the characteristic amount.

The setting contents will be described. The display 1720 indicates the currently selected monitoring target. In FIG. 17, a luminance component has been selected. When the change button is operated, a parameter selection screen 1900 shown in FIG. 19 is displayed. In the parameter selection screen 1900, a list 1902 of types of selectable characteristic amounts is displayed, and a display example of time-series data of each characteristic amount is shown together with the type. Each characteristic amount is extracted from the image data and saved by the camera input unit 4*a* at the time of inputting the camera image from the camera sensor 10, and hence the characteristic amounts may be displayed using those pieces of data. Thus, the user can confirm which characteristic amount has been changed and selectively monitor the characteristic amount. The user can select a desired characteristic amount by selecting a column indicating the type of each characteristic amount and operating an OK button 1903. On the other hand, when a cancel button 1904 is operated, the characteristic amount is not selected and the screen returns to the setting screen 1700. A plurality of characteristic amounts may be made selectable. In this case, a plurality of pieces of characteristic amount data are displayed on the display 1707. When the characteristic amount is changed, the monitoring state 1703 and the NG detection count 1704 may be reset and displayed, and the NG detection count 170 may not be reset and the cumulative count from the start may be displayed. In the case of resetting, information after the change to the setting of the characteristic amount can be seen, while in the case of the cumulative count, the number of times a "state different from usual" is detected after the start of the monitoring can be seen.

The description returns to FIG. 17. On the displays 1715, 1716, setting regions for a monitoring condition 1 and a monitoring condition 2 are displayed, respectively. At least one monitoring condition must be selected for monitoring. Naturally, a plurality of monitoring conditions may be selected at the same time. For example, when the monitoring condition 1 and the monitoring condition 2 are selected, the NG detection results are logically operated (OR in default). When the monitoring conditions are satisfied, the NG detection count is made. Although the two monitoring conditions are described here as an example, other monitoring conditions can be added, and logical operations of a plurality of monitoring conditions can also be set. In each monitoring condition, it is possible to set, for example, "Peak value", an "ON-OFF Count", and the like which are monitoring items, a threshold of the monitoring item, "or more is detected" and "or less is detected" which are determination conditions of the threshold, and the like. When the threshold of the peak value is set, the threshold may be displayed on the monitor of the display 1707. Thus, the user can intuitively set the threshold. As another monitoring condition, a guard band, a distance to a reference signal, a specific timing such as Euclidean or DTW may be set. The guard band determines whether or not the waveform to be monitored is in a defined region, for example, a range having the upper and lower limits. The distance to the reference signal determines the distance from a preset reference value. The specific timing determines whether the value after the lapse of a defined time from the start of the cycle falls within a designated range. The defined value of the monitoring condition may be a value relating to the device value of another device. When the characteristic amount is changed, the change is made so that a threshold corresponding to the characteristic amount can be set.

The display 1717 is a setting region for the cycle cutout. When "Cycle cutout" is enabled, the cycle is automatically cut out in accordance with the conditions set on cycle cutout setting screens 2000, 2010 to be described later, and a graph of the cut out characteristic amount data is displayed on the monitor of the display 1707. In "Time out", the time of one cycle when the cycle cutout is disabled can be set. One cycle is determined in accordance with the time set in "Time-out", and a graph of the cut out characteristic amount data is displayed on the monitor of the display 1707. When the cycle cutout is enabled, the cycle is automatically cut out in accordance with the information set in the cycle cutout setting regardless of the set time-out time, but when an abnormality has occurred, the end of the cycle may not be cut out. In such a case, the cycle is cut out in accordance with the time set in the time-out. The time has been adopted as "Time-out" here, but this is not intended to limit the present subject matter, and for example, the definition may be such that it is determined that one cycle has passed when a certain amount of data has been accumulated in the buffer. For example, when the cycle cutout is enabled and the time-out time has not been set, it may be determined that the cycle has ended when the data size by which buffering is possible is reached. Alternatively, by overwriting the buffer, the processing may be infinitely performed until other cycle ending conditions are satisfied. The cycle cutout setting screen will be described later with reference to FIGS. 20 and 21.

The display 1718 indicates a confirmation button for the set monitoring item. When the confirmation button is operated, the monitoring operation is performed on the basis of the set information. After the confirmation button is operated, the display 1713 is switched so that changes, such as a change in the predetermined region by the display 1719 and a change in the setting of the monitoring condition, cannot be made on the monitor screen of the display.

<Monitoring State Confirmation Screen>

Figure 18:
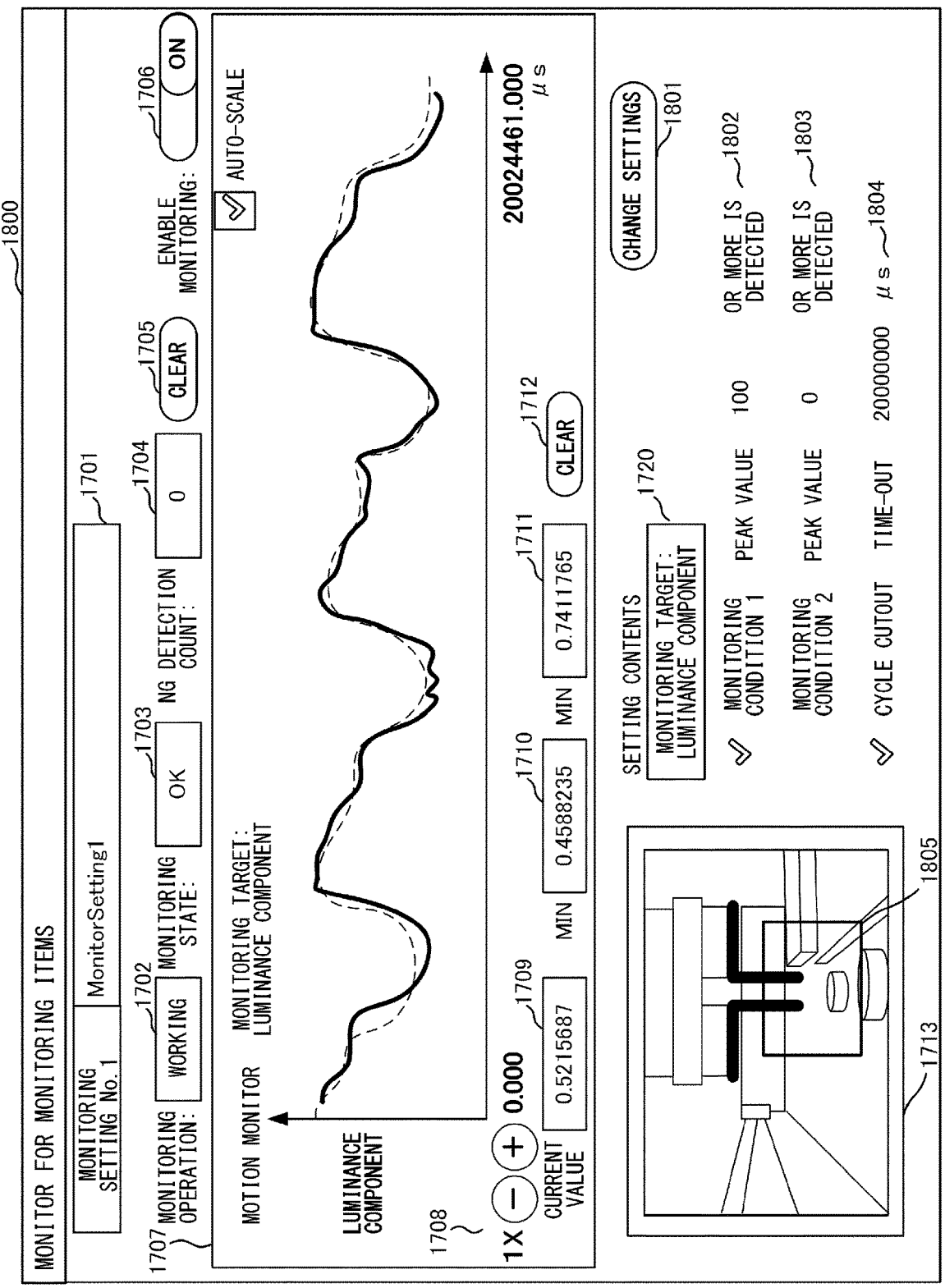
FIG. 18 is a view showing a monitoring item confirmation screen.

FIG. 18 is a view showing an example of a confirmation screen for confirming the monitoring state according to the present embodiment. A confirmation screen 1800 is displayed on the display part 7*b* of the PC 2*b* at a timing S6 above. Note that the screen 1700 may be displayed on the PC 2*a* or other external apparatuses. The confirmation screen 1800 is a screen for confirming the monitoring state in the contents set on the setting screen 1700, and the difference from the setting screen 1700 is that the monitoring item cannot be set. Thus, the same reference numerals are given to a display similar to the setting screen 1700, and the description thereof is omitted.

In the display 1707 and the display 1713, the characteristic amount data and the real-time image taken by the camera sensor 10 are displayed in real time in accordance with the setting information set on the setting screen 1700. In the display 1707, the time-series data of the device value of other related devices may be displayed in a synchronized state. Thus, the user can check the state of the change in more detail.

As shown in displays 1802 to 1804, the setting contents of the monitoring conditions 1, 2 and the cycle cutout cannot be changed on the confirmation screen 1800, and the setting contents set on the setting screen 1700 are displayed. On the other hand, when a setting change button of a display 1801 is operated, the display shifts to the setting screen 1700, and the setting can be performed again. In this manner, according to the present embodiment, the setting can be changed even during the monitoring, and when the confirmation button is operated on the setting screen 1700, the subsequent monitoring is performed in accordance with the set monitoring conditions.

In addition, on the confirmation screen 1800, the camera image and the characteristic amount data at the normal time and the camera image and the characteristic amount data at the time of abnormality may be displayed so as to be comparable with each other. In this case, it is preferable to highlight an abnormal location in the camera image and the characteristic amount data, for example. For these displays, a slide bar may be displayed to display the camera image and the characteristic amount data at a designated time. The time-series data of the device value of other devices corresponding thereto may be displayed in association with each other. This can be achieved by holding the camera image, the characteristic amount data thereof, and the time-series data of the other corresponding device at the timing at which a change different from usual is detected. Although an example of displaying the result image has been described here, a report including the display and the analysis result thereof may be created and stored as a log or transmitted to a predetermined destination. Thereby, even when the operator does not confirm the analysis result in real time, the analysis result at the time of abnormality can be confirmed later.

<Cutout Setting Screen>

Figure 20:
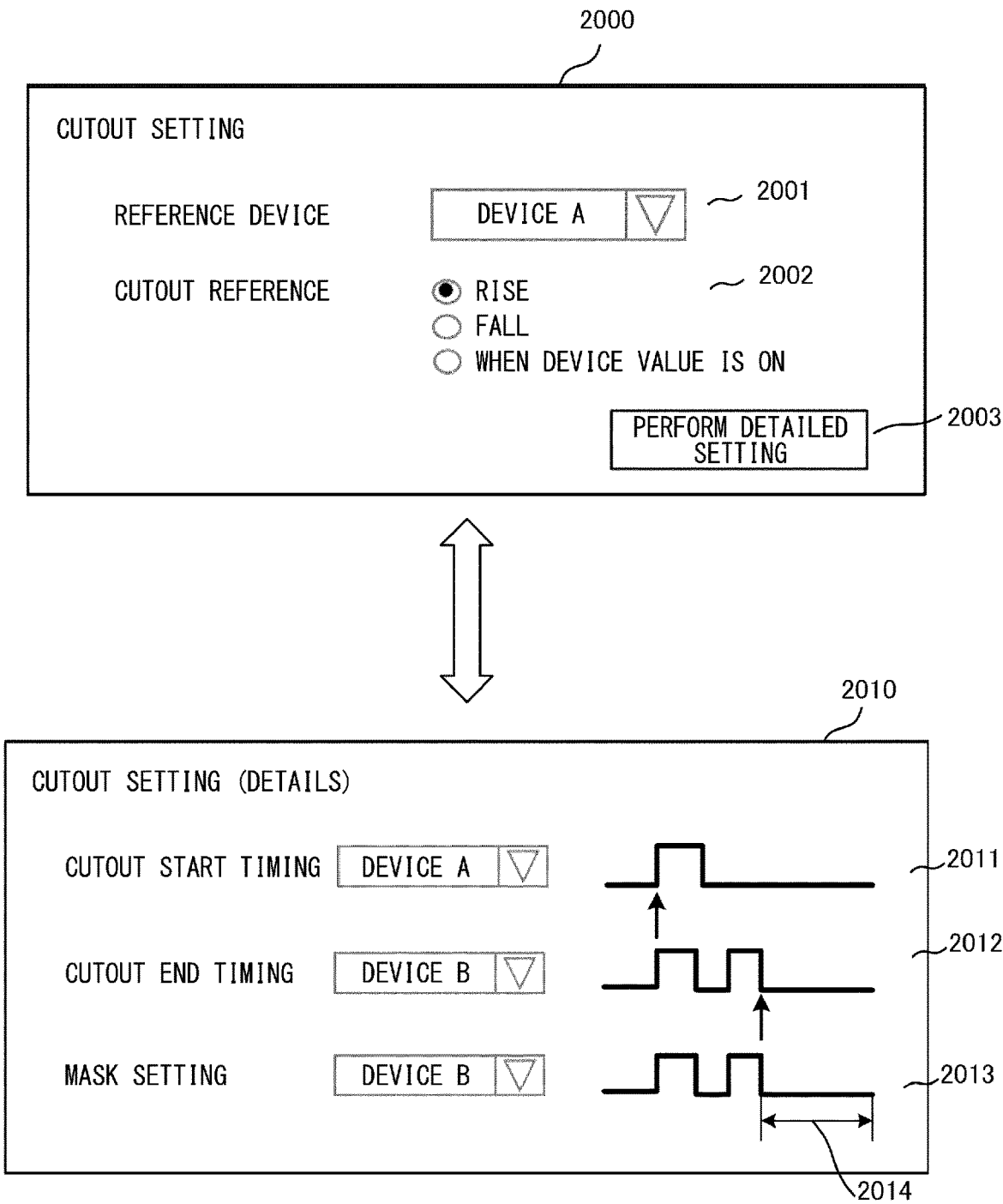
FIG. 20 is a view showing a cutout setting screen.

FIG. 20 is a view showing an example of the cycle cutout setting screen according to the present embodiment. The cycle cutout setting screen 2000 is a screen displayed by a pop-up screen or the like when the cycle cutout is selected in the display 1717 of the setting screen 1700, for example. The cycle cutout setting screen 2010 is a screen which is shifted when "Perform detailed setting" of the display 2003 is selected in the cycle cutout setting screen 2000.

In the cycle cutout setting screen 2000, a display 2001 is a display in which a reference device can be selected. As described above, the reference device is a device serving as a reference for cutout and corresponding to another device value when the monitoring target section of the characteristic amount data from the camera image is cut out in the preprocessing. Here, a state where the device A has been selected is shown. The display 2002 is a display for setting a signal change serving as a cutout reference. FIG. 20 shows, as an example, the state of being able to select a signal rise (from OFF to ON), a signal fall (From ON to OFF), and a section in which a signal value is ON. Other signal changes may be made selectable. Although a binary signal value is illustrated here, the setting may be performed corresponding to a signal value of a multivalued (analog-value) device value. In this case, a predetermined threshold may be set, and a case where the value exceeds the threshold or a case where the value falls below the threshold may be set as a reference for cutout. When "Perform detailed setting" of the display 2003 is operated, a shift is made to the cycle cutout setting screen 2010.

In the cycle cutout setting screen 2010, a display 2011 is a display for setting a cutout start timing. Here, in default, the device A, which is the reference device set on the cycle cutout setting screen 2000, and its cutout reference are displayed. Note that each of those can be changed on this screen. The cutout reference can be changed by selecting the position of the signal change to be the reference position by a pointing device or the like. The display 2012 is a display for setting a cutout end timing. Here, it is possible to set a device having a signal value serving as a reference for the cutout end timing and its cutout reference. In the example shown in FIG. 20, the device B is displayed as the reference device for the cutout end timing, but normally the device A set as the reference device on the cycle cutout setting screen 2000 is displayed in default, and can be changed to another device by pull-down. A display 2013 is a display for setting a section to be masked as a non-monitoring target. For a user operation, for example, the start position of the masked section may be defined by dragging a target signal value with a pointing device or the like, the range of the masked section may be defined by moving the target signal value in a dragged state, and the end of the masked section may be defined by releasing the target signal value. In the example of FIG. 20, it is possible to set a device having a signal value to be a reference and its masked section 2014. In the setting contents set in the cycle cutout setting screen 2010, a section from the rise of the signal of the device A to the second fall of the signal of the device B is set as the cycle cutout section, and a section from the second fall of the signal of the device B to the rise of the signal of the next device A is set as a masked section 2014. Note that the setting items may be reduced by making the cycle start condition and the cycle end condition partially common. For example, while the specific device is ON, the target devices of the cycle start condition and the cycle end condition are the same, which is equivalent to a case where the rise and the fall are installed, respectively, and the setting items can be reduced.

As described above, the programmable logic controller (PLC) according to the present embodiment includes: an execution engine that repeatedly executes a user program; a device memory that stores a device value of a device accessed by the execution engine in accordance with the user program; and a camera input interface for connecting a camera sensor that sequentially takes an image in accordance with photographing conditions and sequentially generates image data of the taken camera image. The PLC sequentially acquires the image data of the camera image from the camera sensor via the camera input interface and generates characteristic amount data indicating a characteristic amount of image data in a preset monitoring region among the acquired image data of the camera image, Further, the PLC sequentially collects generated characteristic amount data to acquire time-series data of characteristic amount and monitors the acquired time-series data of a current characteristic amount in accordance with a monitoring timing defined by the device of the device memory. Thus, according to the present embodiment, a camera image for monitoring is appropriately acquired and analyzed, and a monitoring target can be constantly monitored with high accuracy. For performing constant monitoring, the characteristic amount data of the camera image may be collected in synchronization with a scan cycle for collecting the device value of each device or may be associated with a device value of a predetermined device on the basis of a time stamp of the collected characteristic amount data. These controls can be easily achieved since being configured to acquire a camera image and generate a characteristic amount of the image as a unit of the PLC.

Further, the PLC performs setting relating to image data of a camera image taken by the camera sensor via a setting screen capable of receiving a user input. The PLC generates and outputs a confirmation screen for displaying a monitoring result. Alternatively, the PLC can create and transmit the report to a predetermined destination. From the confirmation screen, it is further possible to shift to a setting screen and to change the setting relating to the monitoring target during the monitoring. When the setting is changed, the monitoring result is changed in accordance with the changed setting content.

<Modification>

Figure 22:
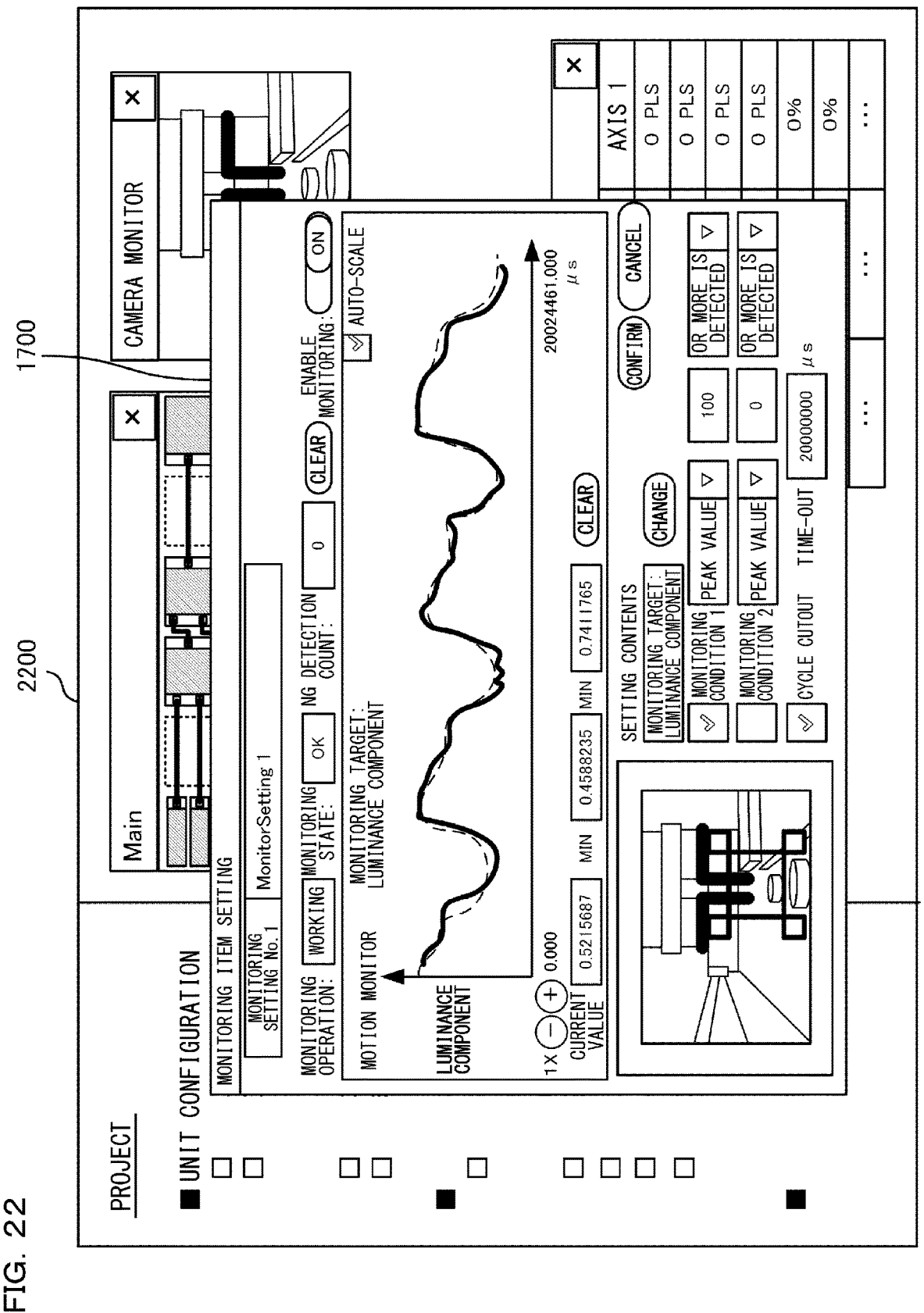
FIG. 22 is a diagram showing a modification of the monitoring item setting screen.

Here, a modification of displaying the setting screen 1700 will be described with reference to FIG. 22. FIG. 22 shows a state where the setting screen 1700 for performing the monitoring setting and the like is called up from a setting screen 2200 for project data. The setting screen 2200 can make various settings for the project data, which are settings relating to the user programs, settings relating to the unit configuration, collection settings, monitoring settings, camera settings, and the like. The setting screen 2200 is a setting screen displayed on the PC 2a connected to the basic unit 3, but the setting screen 1700 for performing the monitoring settings can also be read from the setting screen 2200, and an example in which the setting screen 1700 is displayed on the setting screen 2200 is shown here. This is not limited, and when the monitoring settings are instructed on the setting screen 2200, a shift may be made to the setting screen 1700 as a separate screen. As described above, the setting screen 1700 may be displayed on the PC 2a connected to the basic unit 3 or may be displayed on a PC (Web server) connected to the extension unit such as the analysis unit 4b.

Second Embodiment

In the following, a second embodiment of the present subject matter will be described. In the first embodiment, the example has been described in which the PLC layer includes the basic unit 3, the camera input unit 4a, and the analysis unit 4b. However, the present subject matter is not limited to such a configuration, and a part of the function of each unit may be achieved by other units. For example, the camera input unit 4a and the analysis unit 4b may be provided integrally, or all units may be provided integrally. Further, in the present embodiment, the analysis unit 4b may be provided as an external apparatus except for the PLC layer, and a form in this case will be described in the present embodiment.

Figure 21:
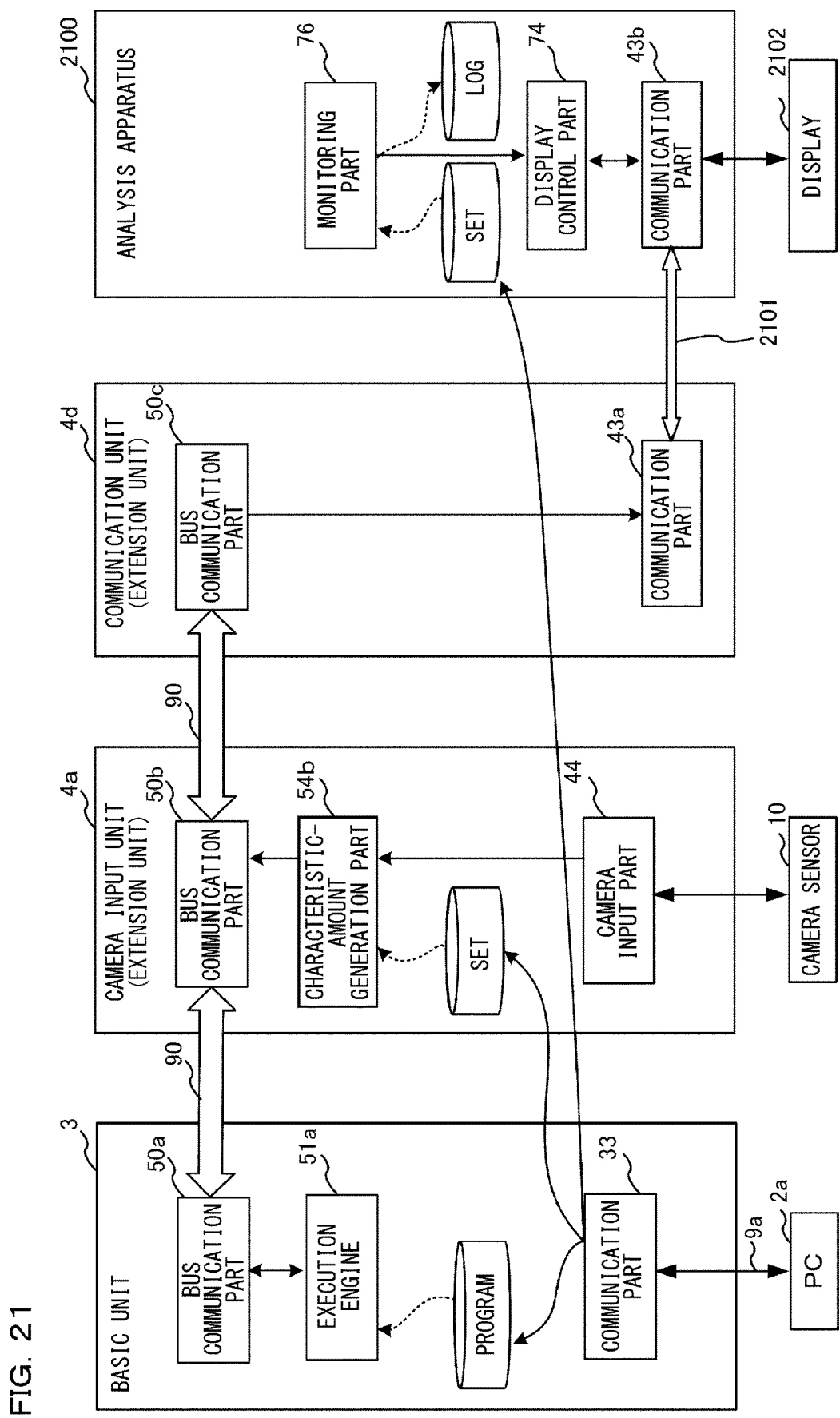
FIG. 21 is a diagram showing a modification of an analysis unit.

FIG. 21 is a diagram showing a configuration in which the analysis unit according to the present embodiment is provided outside the PLC layer. The same reference numerals are given to constituents similar to those of the first embodiment, and the description thereof is omitted. As shown in FIG. 21, in the present embodiment, a communication unit 4c, which is an extension unit, is connected in place of the analysis unit 4b in the first embodiment. Further, an analysis apparatus 2100, which is an external apparatus, is communicably connected via the communication unit 4c. The analysis apparatus 2100 may be connected to an upper layer of the PLC layer to which the camera input unit is connected. By separating the analysis unit from the PLC layer in this manner, space saving can be achieved, and high-level calculations such as PC and cloud computing can be performed. On the other hand, although it is necessary to transfer the data to be monitored to the analysis apparatus 2100, which increases the communication load, the communication volume can be reduced by transferring not the image data itself but the characteristic amount data obtained by extracting the characteristic amount.

The device value of each devices collected by the basic unit 3 and the characteristic amount data of the camera image are transferred to the analysis apparatus 2100 via the communication unit 4c. More specifically, the communication unit 4c receives transfer data from the basic unit 3 via the extension bus 90 and transfers the transfer data to the analysis apparatus 2100 via the communication part 43a. The communication part 43a further transmits image data (image data). With the image data being used for monitoring, the transmission frequency of the image data may be low as compared to those of the device value and the characteristic amount data. Note that a time is preferably added to the characteristic amount data. Thereby, when an abnormality is detected by the analysis apparatus 2100, the occurrence time thereof can be displayed.

The analysis apparatus 2100 receives the transfer data in the communication part 43b through a network 2101 such as a local area network (LAN) and performs the monitoring processing on the basis of the received transfer data. For the monitoring processing, a similar control is performed in a similar configuration to the analysis unit 4b of the first embodiment, and hence the description thereof is omitted. The monitoring result is displayed on a display 2102 of the analysis apparatus 2100. The display control part 74 displays the setting screen 1700 and the confirmation screen 1800 on the display 2102. The monitoring result may be transmitted to the PLC 1 via the communication part 43b. The analysis apparatus may be provided integrally with the PC 2b. In this case, the confirmation screen 1800 and the setting screen 1700 may be displayed on the display of the analysis apparatus.

Third Embodiment

In the following, a third embodiment of the present subject matter will be described. In the first embodiment, the example in which the constant monitoring is performed has been described, but the present subject matter is not limited to the configuration in which the constant monitoring is performed. For example, instead of or in addition to performing the monitoring processing in real time, information left in the memory card 44 or the like may be used as log information to perform analysis later.

As described above, when the saving condition is satisfied, the device value of each device and the characteristic amount data are saved into the memory card 44 of the basic unit 3 or the memory card (not shown) of the analysis unit 4b. The saving condition is satisfied, for example, when an abnormality is detected in the captured image of the camera sensor 10, when an abnormality occurs in the PLC, when a device to be a saving trigger is designated in advance by the user and there is a predetermined change in the device, when an analysis command is issued by the user, when a monitoring cycle for periodic monitoring has elapsed, when an analysis command is issued from the extension unit connected to the basic unit 3, and in some other cases.

In this manner, when the analysis processing is performed later in accordance with log information saved in the memory card or the like, an abnormal device and an abnormality factor can be specified by an external apparatus having a high processing capacity, and the analysis can be performed more effectively. Further, as described above, the device value of a predetermined device and the characteristic amount data of the camera image have been the monitoring targets in the case of the constant monitoring, but the device values of all devices can be stored as log information. Therefore, it is possible to adopt a method of performing the constant monitoring until an abnormality occurs in a predetermined device and performing more detailed analysis on the basis of log information of each of all devices when an abnormality occurs in the predetermined device.

The present subject matter is not limited to the above embodiments, and various modifications and changes are possible within the scope of the gist of the subject matter.

What is claimed is:

1. A programmable logic controller comprising:
    an execution engine that repeatedly executes a user program;
    a device memory that stores a device value of a device to be accessed by the execution engine in accordance with the user program;
    a camera input interface for connecting a camera sensor that sequentially takes an image in accordance with a photographing condition and sequentially generates image data of the taken camera image;
    an image processing section for sequentially acquiring the image data of the camera image from the camera sensor via the camera input interface and generating characteristic amount data indicating a characteristic amount of image data in a preset monitoring region among the acquired image data of the camera image;
    a time-series data acquisition section for sequentially collecting characteristic amount data from the image processing section and acquiring time-series data of a characteristic amount; and
    a monitoring section for monitoring time-series data of a current characteristic amount acquired by the time-series data acquisition section in accordance with a monitoring timing defined by the device of the device memory, wherein
    the time-series data acquisition section further collects a device value sequentially from the device memory to acquire time-series data of the device value, and
    the monitoring section monitors the time-series data of the current characteristic amount acquired by the time-series data acquisition section and the time-series data of the current device values, acquired by the time-series data acquisition section, in accordance with the monitoring timing defined by the device of the device memory.

2. The programmable logic controller according to claim 1, further comprising:
    a collection section for collecting a device value of each of devices stored in the device memory in a predetermined collection cycle to accumulate the collected device value in a first buffer memory, collecting characteristic amount data generated by the image processing section in the predetermined collection cycle to accumulate collected characteristic amount data in a second buffer memory, and saving the time-series data of the device value of each of the devices accumulated in the first buffer memory and the time-series data of the characteristic amount accumulated in the second buffer memory into a saving memory in accordance with a saving condition,
    wherein the monitoring section further performs monitoring using time-series data of a device value of a predetermined device saved into the saving memory by the collection section and time-series data of the characteristic amount data obtained from the image data acquired by the camera input interface.

3. The programmable logic controller according to claim 2, wherein
    the monitoring section monitors whether the characteristic amount data is abnormal, and
    the collection section saves, into the saving memory,
    the time-series data of the device value of each of the devices accumulated in the first buffer memory and the time-series data of the characteristic amount or a plurality of pieces of image data accumulated in the second buffer memory when an abnormality of the characteristic amount data is set as the saving condition and the monitoring section detects an abnormality.

4. The programmable logic controller according to claim 2, wherein the predetermined collection cycle is a scan cycle in which the execution engine accesses the device memory.

5. The programmable logic controller according to claim 2, wherein
    the collection section saves the device value of each of the devices, stored in the device memory, into the first buffer memory together with a time stamp at a time of acquisition, and
    the monitoring section performs monitoring using the time-series data of the device value of the predetermined device collected and accumulated by the collection section and the time-series data of the pieces of characteristic amount data corresponding to the time stamp.

6. The programmable logic controller according to claim 5, wherein
    the characteristic amount includes at least one of a luminance component, a color difference (blue) component, a color difference (red) component, an R component, a G component, a B component, and degrees of change in those components, and
    the image processing section extracts an average value of at least one of the characteristic amount, a gradient strength, and a gradient angle in the monitoring region.

7. The programmable logic controller according to claim 6, further comprising
    a setting section for performing setting relating to monitoring, including a position of the monitoring region and a type of the characteristic amount,
    wherein the image processing section generates the characteristic amount data indicating the characteristic amount of the image data in the monitoring region in accordance with the position of the monitoring region and the type of the characteristic amount received by the setting section.

8. The programmable logic controller according to claim 7, wherein the setting section performs setting relating to image data of a camera image taken by the camera sensor via a setting screen capable of receiving a user input.

9. The programmable logic controller according to claim 8, wherein the setting screen displays a camera image taken by the camera sensor, and the monitoring region is settable on the display.

10. The programmable logic controller according to claim 8, wherein a component to be extracted as the characteristic amount and a threshold for detecting an abnormality are settable on the setting screen.

11. The programmable logic controller according to claim 6, further comprising
a setting section for receiving a setting relating to monitoring, including positions of a plurality of the monitoring regions,
wherein the image processing section generates characteristic amount data indicating a characteristic amount of image data in each of the monitoring regions in accordance with the positions of the plurality of monitoring regions received by the setting section,
the time-series data acquisition section sequentially collects the characteristic amount data for each of the monitoring regions from the image processing section and acquires time-series data of a characteristic amount for each of the monitoring regions, and
the monitoring section monitors the time-series data of the current characteristic amount for each of the monitoring region acquired by the time-series data acquisition section and time-series data of current device values in accordance with a monitoring timing defined by the device of the device memory.

12. The programmable logic controller according to claim 1, further comprising:
a collection section for collecting a device value of each of devices stored in the device memory in a predetermined collection cycle to accumulate the collected device value in a first buffer memory, collecting the pieces of image data of the camera images sequentially acquired from the camera sensor via the camera input interface in the predetermined collection cycle to accumulate the collected image data in a second buffer memory, and saving the time-series data of the device value of each of the devices accumulated in the first buffer memory and the plurality of pieces of image data accumulated in the second buffer memory into a saving memory in accordance with a saving condition,
wherein the monitoring section further performs monitoring using time-series data of a device value of a predetermined device saved into the saving memory by the collection section and time-series data of characteristic amount data obtained from the image data saved into the saving memory.

13. A programmable logic controller comprising:
an execution engine that repeatedly executes a user program;
a device memory that stores a device value of a device to be accessed by the execution engine in accordance with the user program;
a camera input interface for connecting a camera sensor that sequentially takes an image in accordance with a photographing condition and sequentially generates image data of the taken camera image;
an image processing section for sequentially acquiring the image data of the camera image from the camera sensor via the camera input interface and generating characteristic amount data indicating a characteristic amount of image data in a preset monitoring region among the acquired image data of the camera image;
a time-series data acquisition section for sequentially collecting characteristic amount data from the image processing section and acquiring time-series data of a characteristic amount;
a monitoring section for monitoring time-series data of a current characteristic amount acquired by the time-series data acquisition section in accordance with a monitoring timing defined by the device of the device memory; and
an output section for outputting a monitoring result for confirming a state of monitoring by the monitoring section, wherein
the output section generates and outputs a confirmation screen for confirming the monitoring state, and
an abnormal location in the camera image and the characteristic amount data in which an abnormality is detected is highlighted on the confirmation screen.

14. The programmable logic controller according to claim 13, wherein a shift is possible from the confirmation screen to a setting screen for performing a setting relating to image data of a camera image taken by the camera sensor.

15. A programmable logic controller comprising:
an execution engine that repeatedly executes a user program;
a device memory that stores a device value of a device to be accessed by the execution engine in accordance with the user program;
a camera input interface for connecting a camera sensor that sequentially takes an image in accordance with a photographing condition and sequentially generates image data of the taken camera image;
an image processing section for sequentially acquiring the image data of the camera image from the camera sensor via the camera input interface and generating characteristic amount data indicating a characteristic amount of image data in a preset monitoring region among the acquired image data of the camera image;
a time-series data acquisition section for sequentially collecting characteristic amount data from the image processing section and acquiring time-series data of a characteristic amount; and
a monitoring section for monitoring time-series data of a current characteristic amount acquired by the time-series data acquisition section in accordance with a monitoring timing defined by the device of the device memory, wherein
the execution engine and the device memory are provided in a basic unit of the programmable logic controller,
the camera input interface and the image processing section are provided as a first extension unit to which the camera sensor is connected, and
the monitoring section is provided as a second extension unit different from the first extension unit, and the second extension unit collects a device value of a predetermined device and the characteristic amount data during constant monitoring.

16. The programmable logic controller according to claim 15, wherein the first extension unit and the second extension unit are provided integrally.

17. The programmable logic controller according to claim 15, wherein the second extension unit is a communication unit able to communicate with an analysis apparatus that is capable of communication via a network, the second extension unit transmitting and receiving data to and from the analysis apparatus via the network to achieve a function of the monitoring section.

* * * * *